(12) United States Patent
Moreau

(10) Patent No.: US 12,136,222 B2
(45) Date of Patent: Nov. 5, 2024

(54) STRUCTURE CONTOURING, SUCH AS FOR SEGMENTATION OR RADIATION TREATMENT PLANNING, USING A 3D PAINT BRUSH COMBINED WITH AN EDGE-DETECTION ALGORITHM

(71) Applicant: Elekta, Inc., Atlanta, GA (US)

(72) Inventor: Michel Moreau, Verona, WI (US)

(73) Assignee: Elekta, Inc., Atlanta, GA (US)

( * ) Notice: Subject to any disclaimer, the term of this patent is extended or adjusted under 35 U.S.C. 154(b) by 181 days.

(21) Appl. No.: 17/658,783

(22) Filed: Apr. 11, 2022

(65) Prior Publication Data

US 2023/0082049 A1 Mar. 16, 2023

Related U.S. Application Data

(60) Provisional application No. 63/261,287, filed on Sep. 16, 2021.

(51) Int. Cl.
*G06T 7/13* (2017.01)
*G06T 17/20* (2006.01)

(52) U.S. Cl.
CPC .............. *G06T 7/13* (2017.01); *G06T 17/205* (2013.01); *G06T 2207/10081* (2013.01); *G06T 2207/10116* (2013.01); *G06T 2207/20104* (2013.01)

(58) Field of Classification Search
CPC ......... G06T 7/13; G06T 7/181; G06T 17/205; G06T 2207/10081; G06T 2207/10116; G06T 2207/20104; G06T 5/002; G06T 2207/20182; G06T 11/20; G06T 11/80; G06T 2207/20092
See application file for complete search history.

(56) References Cited

U.S. PATENT DOCUMENTS 8,693,744 B2  4/2014  Piper
8,805,035 B2  8/2014  Piper
(Continued)

FOREIGN PATENT DOCUMENTS

EP   3731179       10/2020
WO   WO-0129770 A2 *  4/2001  ........... G06T 3/0068
WO   2013155358   10/2013

OTHER PUBLICATIONS

"Active contour model", [Online]. Retrieved from the Internet<URL:https://en.wikipedia.org/wiki/Active_contour_model>, (Last edited:Jun. 29, 2021), 11 pgs.
(Continued)

*Primary Examiner* — Antonio A Caschera
(74) *Attorney, Agent, or Firm* — Schwegman Lundberg & Woessner, P.A.

(57) ABSTRACT

Techniques for contouring of a region of interest based on imaging parameters of spatial imaging data and guided by user input of locations in the spatial imaging data, which may be used for segmentation or radiation treatment planning. An approach of combining a new paint brush tool with an edge-detection algorithm to correct for both the jagged contours and the painting routine not being executed often enough. By using an edge-detection algorithm, the user does not need to focus as much attention on moving the mouse accurately because the system will find the true organ boundary (e.g., using the image gradient) automatically, which may also lead to more time savings.

28 Claims, 15 Drawing Sheets

(56) References Cited

U.S. PATENT DOCUMENTS

| | | | |
|---|---|---|---|
| 9,630,023 B2 | 4/2017 | Luan et al. | |
| 9,792,525 B2 | 10/2017 | Piper | |
| 10,599,948 B2 | 3/2020 | Piper | |
| 2006/0103670 A1* | 5/2006 | Matsumoto | G06T 15/08 345/626 |
| 2020/0226798 A1* | 7/2020 | Morard | G06T 11/60 |
| 2021/0224987 A1* | 7/2021 | Smith | G06T 7/13 |

OTHER PUBLICATIONS

Kass, Michael, et al., "Snakes: Active Contour Models", International Journal of Computer Vision, (1988), 11 pgs.

Szalay, Alexander S., et al., "Indexing the Sphere with the Hierarchical Triangular Mesh", Microsoft Research Advanced Technology Division Technical Report MSR-TR-2005-123, (Aug. 2005), 23 pgs.

"European Application Serial No. 22196113.9, Extended European Search Report mailed Jan. 31, 2023", 12 pgs.

Ney, Derek R, "Editing Tools for 3D Medical Imaging", IEEE Computer Graphics and Applications, IEEE Service Center, New York, NY, US, vol. 11, No. 6, (Nov. 1, 1991), 63-71.

Soltészová, Veronika, "Advanced vol. painting with game controllers", SCCG '09—Proceedings Of The 25th Spring Conference On Computer Graphics, (Jan. 23, 2009), 113-120.

Yushkevich, Paul A., "User-guided 3D active contour segmentation of anatomical structures: Significantly improved efficiency and reliability", NEUROIMAGE, Elsevier, Amsterdam, NL, vol. 31, No. 3, (Jul. 1, 2006), 1116-1128.

Zhao, Youbing, "iVolBrush An Intelligent Interactive Tool for Efficient Volume Selection and Editing", (Dec. 27, 2010), 231-235.

"European Application Serial No. 22196113.9, Response filed Aug. 21, 2023 to Extended European Search Report mailed Jan. 31, 2023", 7 pgs.

\* cited by examiner

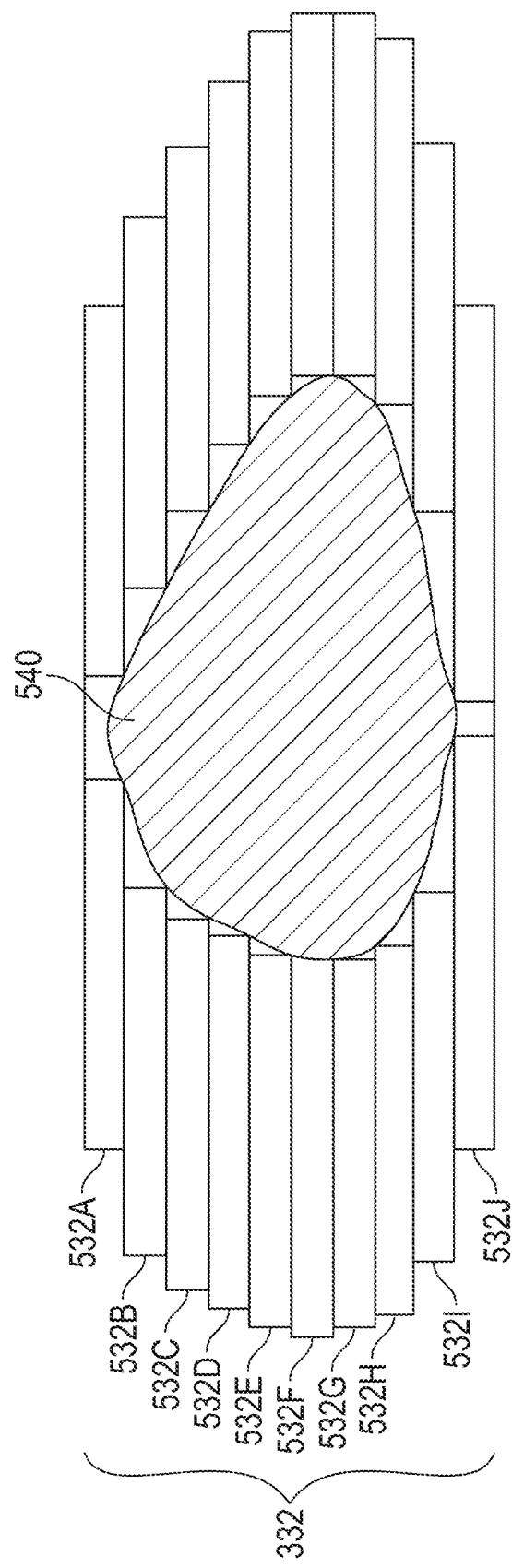

STRUCTURE CONTOURING, SUCH AS FOR SEGMENTATION OR RADIATION TREATMENT PLANNING, USING A 3D PAINT BRUSH COMBINED WITH AN EDGE-DETECTION ALGORITHM

CLAIM OF PRIORITY

This application claims the benefit of priority of U.S. Provisional Patent Application Ser. No. 63/261,287, titled "STRUCTURE CONTOURING, SUCH AS FOR SEGMENTATION OR RADIATION TREATMENT PLANNING, USING A 3D PAINT BRUSH COMBINED WITH AN EDGE-DETECTION ALGORITHM" to Michel Moreau, filed on Sep. 16, 2021, the entire contents of which being incorporated herein by reference.

STATEMENT REGARDING FEDERALLY SPONSORED RESEARCH OR DEVELOPMENT

This invention was made with government support under Grant No. PAR 18-009, 1R01CA247960-01 awarded by the National Institutes of Health (NIH). The government has certain rights in the invention.

TECHNICAL FIELD

Embodiments of the present disclosure pertain generally to radiotherapy treatment sessions and specifically to image processing techniques.

BACKGROUND

Radiation therapy (or "radiotherapy") may be used to treat cancers or other ailments in mammalian (e.g., human and animal) tissue. One such radiotherapy technique involves irradiation with a Gamma Knife®, whereby a patient is irradiated by a large number of low-intensity gamma ray beams that converge with high intensity and high precision at a target (e.g., a tumor). In another embodiment, radiotherapy is provided using a linear accelerator, whereby a tumor is irradiated by high-energy particles (e.g., electrons, protons, ions, high-energy photons, and the like). The placement and dose of the radiation beam must be accurately controlled to ensure the tumor receives the prescribed radiation, and the placement of the beam should be such as to minimize damage to the surrounding healthy tissue, often called the organ(s) at risk (OARs). Radiation is termed "prescribed" because a physician orders a predefined amount of radiation to the tumor and surrounding organs similar to a prescription for medicine. Generally, ionizing radiation in the form of a collimated beam is directed from an external radiation source toward a patient but the radiation may also come from radioactive seeds located in the tumor.

The treatment planning procedure may include using a three-dimensional (3D) image of the patient to identify a target region (e.g., the tumor) and to identify critical organs near the tumor.

OVERVIEW

This disclosure is directed to, among other things, techniques for 3D contouring of a region of interest based on imaging parameters of 3D spatial imaging data and guided by user input of locations in the 3D spatial imaging data, which may be used for segmentation or radiation treatment planning. The disclosure describes an approach of combining a new 3D paint brush tool with an edge-detection algorithm to correct for both the jagged contours and the painting routine not being executed often enough. By painting in 3D, the user saves time. And by using an edge-detection algorithm, the user does not need to focus as much attention on moving the mouse accurately because the system will find the true organ boundary (e.g., using the image gradient) automatically, which may also lead to more time savings.

In some aspects, this disclosure is directed to a computer-implemented method of contouring of a region of interest based on imaging parameters of spatial imaging data and guided by user input of locations in the spatial imaging data, the method comprising: representing a paint brush shape for the contouring as a surface mesh including a plurality of rays and having a center located at a position of a cursor controlled by the user; within the surface mesh, detecting structure edges for a boundary of the region of interest via an edge detection algorithm using the imaging parameters of the 3D spatial imaging data and along the plurality of rays; and smoothing the paint brush shape via a mesh smoothing algorithm.

In some aspects, this disclosure is directed to a computer-implemented method of contouring of a region of interest based on imaging parameters of spatial imaging data and guided by user input of locations in the spatial imaging data, the method comprising: receiving first and second location seed points from a user via user input received in conjunction with corresponding displayed spatial imaging data: defining a seed axis extending between the first and second location seed points; edge detecting for a boundary of the region of interest via an edge detection algorithm using the imaging parameter of the spatial imaging data and using rays extending outward perpendicular to the seed axis or perpendicular to first or second semi-spheres defined using the first and second seed locations; and smoothing a paint brush shape via a mesh smoothing algorithm.

In some aspects, this disclosure is directed to a computer-readable medium configured to include instructions that, when executed by a machine, cause the machine to perform operations comprising: representing a paint brush shape for contouring as a surface mesh including a plurality of rays and having a center located at a position of a cursor controlled by a user; within the surface mesh, detecting structure edges for a boundary of a region of interest via an edge detection algorithm using imaging parameters of spatial imaging data and along the plurality of rays; and smoothing the paint brush shape via a mesh smoothing algorithm.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example but not by way of limitation, various embodiments discussed in the present document.

FIG. 5 illustrates an example of a collimator configuration for shaping, directing, or modulating an intensity of a radiation therapy beam, according to some embodiments of the present disclosure.

DETAILED DESCRIPTION

In the following detailed description, reference is made to the accompanying drawings which form a part hereof, and which is shown by way of illustration-specific embodiments in which the present disclosure may be practiced. These embodiments, which are also referred to herein as "examples," are described in sufficient detail to enable those skilled in the art to practice the disclosure, and it is to be understood that the embodiments may be combined, or that other embodiments may be utilized, and that structural, logical, and electrical changes may be made without departing from the scope of the present disclosure. The following detailed description is, therefore, not be taken in a limiting sense, and the scope of the present disclosure is defined by the appended claims and their equivalents.

In radiation treatment planning, using a computer system configured with software for allowing a physician or other user to perform manual structure contouring (e.g., of a region of interest (ROI) or organ-at-risk (OAR)) and manual contour editing, such user-driven contouring, may be a time-consuming process. Structure contouring and contour editing may be done in two-dimensional imaging data (2D) (e.g., processing one image slice at a time) or three-dimensional imaging data (3D) (e.g., processing multiple image slices at the same time). The present inventor has recognized, among other things, that a contouring and contour editing tool that allows the user to move the mouse more rapidly and that does not require constant attention would represent important time savings, which, in turn will help reduce the cost and improve the quality of medical care.

This disclosure is directed to, among other things, techniques for 3D contouring of a region of interest based on imaging parameters of 3D spatial imaging data and guided by user input of locations in the 3D spatial imaging data, which may be used for segmentation or radiation treatment planning. The disclosure describes an approach of combining a new 3D paint brush tool with an edge-detection algorithm to correct for both the jagged contours and the painting routine not being executed often enough. By painting in 3D, the user saves time. And by using an edge-detection algorithm, the user does not need to focus as much attention on moving the mouse accurately because the system will find the true organ boundary (e.g., using the image gradient) automatically, which may also lead to more time savings.

Figure 1:
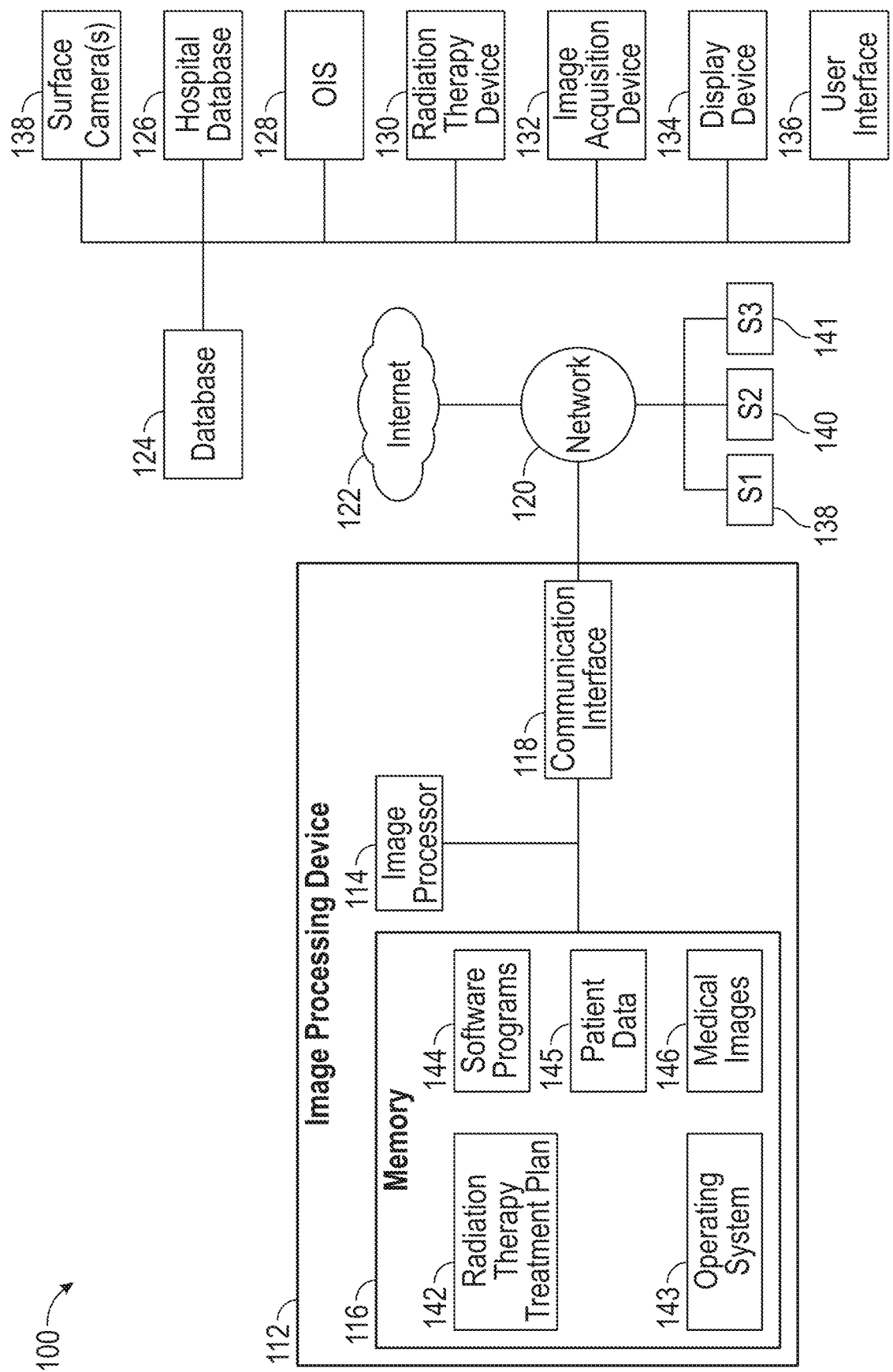
FIG. 1 illustrates an example of a radiotherapy system, according to some embodiments of the present disclosure.

FIG. 1 illustrates an example of a radiotherapy system 100 for providing radiation therapy to a patient. The radiotherapy system 100 includes an image processing device 112. The image processing device 112 may be connected to a network 120. The network 120 may be connected to the Internet 122. The network 120 may connect the image processing device 112 with one or more of a database 124, a hospital database 126, an oncology information system (OIS) 128, a radiation therapy device 130, an image acquisition device 132, a display device 134, a user interface 136, and one or more surface cameras 138, such as surface cameras 138A-138C in FIG. 2A and/or surface camera 138D in FIG. 2B. Examples of surface cameras 138 may include those manufactured by C-Rad, VisionRT, and Varian HumediQ. The surface camera(s) 138 (e.g., one or more 2D or 3D cameras) may be used to acquire real-time images of the surface of a patient's body (e.g., the patient's skin) while medical images are being acquired. For Gamma Knife® mask treatments, an IR camera registers movements of markers fixed on the nose of the patient. Because the surface imaging is taken at the same time as the medical imaging, the surface imaging may provide a more accurate definition of the location of the boundaries of the patient's body while the medical imaging was taken. The image processing device 112 may be configured to generate radiation therapy treatment plans 142 to be used by the radiation therapy device 130.

The image processing device 112 may include a memory device 116, an image processor 114, and a communication interface 118. The memory device 116 may store computer-executable instructions, such as an operating system 143, radiation therapy treatment plans 142 (e.g., original treatment plans, adapted treatment plans and the like), software programs 144 (e.g., artificial intelligence, deep learning, neural networks, radiotherapy treatment plan software), and any other computer-executable instructions to be executed by the image processor 114.

In one embodiment, the software programs 144 may convert medical images of one format (e.g., MRI) to another format (e.g., CT) by producing synthetic images, such as pseudo-CT images. For instance, the software programs 144 may include image processing programs to train a predictive model for converting a medical image 146 in one modality (e.g., an MRI image) into a synthetic image of a different modality (e.g., a pseudo-CT image); alternatively, the trained predictive model may convert a CT image into an MRI image.

In another embodiment, the software programs 144 may register the patient image (e.g., a CT image or an MR image) with that patient's dose distribution (also represented as an image) so that corresponding image voxels and dose voxels are associated appropriately by the network.

In yet another embodiment, the software programs 144 may substitute functions of the patient images or processed versions of the images that emphasize some aspect of the image information. Such functions might emphasize edges or differences in voxel textures, or any other structural aspect useful to neural network learning.

In another embodiment, the software programs 144 may substitute functions of the dose distribution that emphasize some aspect of the dose information. Such functions might emphasize steep gradients around the target or any other structural aspect useful to neural network learning. The memory device 116 may store data, including medical images 146, patient data 145, and other data required to create and implement a radiation therapy treatment plan 142.

In yet another embodiment, the software programs 144 may generate a structural estimate (e.g., a 3D model of the region of interest) using an iterative image reconstruction process. The structural estimate may be or include an X-ray attenuation map that represents a 3D model of a region of interest. The structural estimate may be used to estimate or simulate X-ray measurements to be compared with real X-ray measurements for updating the structural estimate. Specifically, the software programs 144 may access a current structural estimate of the region of interest and generate a first simulated X-ray measurement based on the current structural estimate of the region of interest.

A simulated X-ray measurement, as referred to herein, represents the expected output of an X-ray detector element when an X-ray source projects one or more X-ray beams through the region of interest towards the X-ray detector element. The simulated X-ray measurement may provide an expected image output that is to be received from the X-ray detector element.

The software programs 144 may receive a first real X-ray measurement from a CBCT system (or other CT imaging system, such as an enclosed gantry helical multi-slice CT with a curved detector or tomotherapy system) and generate an update to the current structural estimate of the region of interest as a function of the first simulated X-ray measurement and the first real X-ray measurement. A real X-ray measurement, as referred to herein, is an actual output that is received from a CBCT system (or other CT imaging system, such as an enclosed gantry helical multi-slice CT with a curved detector or tomotherapy system) that represents the amount of signal generated by X-rays in the detector along different directions, such as in an image form.

The update may be generated invariant on (independent of) the current structural estimate. The structural estimate may be used to control one or more radiotherapy treatment parameters by recalculating dose, adjusting one or more radiotherapy treatment machine parameters, or generating a display of the structural estimate on a graphical user interface.

In addition to the memory device 116 storing the software programs 144, it is contemplated that software programs 144 may be stored on a removable computer medium, such as a hard drive, a computer disk, a CD-ROM, a DVD, a HD, a Blu-Ray DVD, USB flash drive, a SD card, a memory stick, or any other suitable medium; and the software programs 144 when downloaded to image processing device 112 may be executed by image processor 114.

The processor 114 may be communicatively coupled to the memory device 116, and the processor 114 may be configured to execute computer-executable instructions stored thereon. The processor 114 may send or receive medical images 146 to memory device 116. For example, the processor 114 may receive medical images 146 from the image acquisition device 132 via the communication interface 118 and network 120 to be stored in memory device 116. The processor 114 may also send medical images 146 stored in memory device 116 via the communication interface 118 to the network 120 be either stored in database 124 or the hospital database 126.

Further, the processor 114 may utilize software programs 144 (e.g., a treatment planning software) along with the medical images 146 and patient data 145 to create the radiation therapy treatment plan 142. Medical images 146 may include information such as imaging data associated with a patient anatomical region, organ, or volume of interest segmentation data. Patient data 145 may include information such as (1) functional organ modeling data (e.g., serial versus parallel organs, appropriate dose response models, etc.); (2) radiation dosage data (e.g., DVH information); or (3) other clinical information about the patient and course of treatment (e.g., other surgeries, chemotherapy, previous radiotherapy, etc.).

In addition, the processor 114 may utilize software programs to generate intermediate data such as updated parameters to be used, for example, by a machine learning model, such as a neural network model; or generate intermediate 2D or 3D images, which may then subsequently be stored in memory device 116. The processor 114 may subsequently transmit the executable radiation therapy treatment plan 142 via the communication interface 118 to the network 120 to the radiation therapy device 130, where the radiation therapy plan will be used to treat a patient with radiation. In addition, the processor 114 may execute software programs 144 to implement functions such as image conversion, image segmentation, deep learning, neural networks, and artificial intelligence. For instance, the processor 114 may execute software programs 144 that train or contour a medical image; such software programs 144 when executed may train a boundary detector or utilize a shape dictionary.

The processor 114 may be a processing device, including one or more general-purpose processing devices such as a microprocessor, a central processing unit (CPU), a graphics processing unit (GPU), an accelerated processing unit (APU), or the like. More particularly, the processor 114 may be a complex instruction set computing (CISC) microprocessor, a reduced instruction set computing (RISC) microprocessor, a very long instruction Word (VLIW) microprocessor, a processor implementing other instruction sets, or processors implementing a combination of instruction sets. The processor 114 may also be implemented by one or more special-purpose processing devices such as an application-specific integrated circuit (ASIC), a field programmable gate array (FPGA), a digital signal processor (DSP), a System on a Chip (SoC), or the like. As would be appreciated by those skilled in the art, in some embodiments, the processor 114 may be a special-purpose processor rather than a general-purpose processor. The processor 114 may include one or more known processing devices, such as a microprocessor from the Pentium™, Core™, Xeon™, or Itanium® family manufactured by Intel™, the Turion™, Athlon™, Sempron™, Opteron™, FX™, Phenom™ family manufactured by AMD™, or any of various processors manufactured by Sun Microsystems. The processor 114 may also include graphical processing units such as a GPU from the GeForce®, Quadro®, Tesla® family manufactured by Nvidia™, GMA, Iris™ family manufactured by Intel™, or the Radeon™ family manufactured by AMD™. The processor 114 may also include accelerated processing units such as the Xeon Phi™ family manufactured by Intel™. The disclosed embodiments are not limited to any type of processor(s) otherwise configured to meet the computing demands of identifying, analyzing, maintaining, generating, and/or providing large amounts of data or manipulating such data to perform the methods disclosed herein. In addition, the term "processor" may include more than one processor (for example, a multi-core design or a plurality of processors each having a multi-core design). The processor 114 may execute sequences of computer program instructions, stored in memory device 116, to perform various operations, processes, methods that will be explained in greater detail below.

The memory device 116 may store medical images 146. In some embodiments, the medical images 146 may include one or more MRI images (e.g., 2D MRI, 3D MRI, 2D streaming MRI, four-dimensional (4D) MRI, 4D volumetric MRI, 4D cine MRI, etc.), functional MRI images (e.g., fMRI, DCE-MRI, diffusion MRI), CT images (e.g., 2D CT, cone beam CT, 3D CT, 4D CT), ultrasound images (e.g., 2D ultrasound, 3D ultrasound, 4D ultrasound), one or more projection images representing views of an anatomy depicted in the MRI, synthetic CT (pseudo-CT), and/or CT images at different angles of a gantry relative to a patient axis, PET images, X-ray images, fluoroscopic images, radiotherapy portal images, SPECT images, computer generated synthetic images (e.g., pseudo-CT images), aperture images, graphical aperture image representations of MLC leaf positions at different gantry angles, and the like. Further, the medical images 146 may also include medical image data, for instance, training images, ground truth images, contoured images, and dose images. In an embodiment, the medical images 146 may be received from the image acquisition device 132. Accordingly, image acquisition device 132 may include an MRI imaging device, a Megavolt (MV) imaging device, a CT imaging device, a CBCT imaging device, a PET imaging device, an ultrasound imaging device, a fluoroscopic device, a SPECT imaging device, an integrated linac and MRI imaging device, an integrated linac and CT imaging device, an integrated linac and CBCT imaging device, or other medical imaging devices for obtaining the medical images of the patient. The medical images 146 may be received and stored in any type of data or any type of format that the image processing device 112 may use to perform operations consistent with the disclosed embodiments.

The memory device 116 may be a non-transitory computer-readable medium, such as a read-only memory (ROM), a phase-change random access memory (PRAM), a static random access memory (SRAM), a flash memory, a random access memory (RAM), a dynamic random access memory (DRAM) such as synchronous DRAM (SDRAM), an electrically erasable programmable read-only memory (EEPROM), a static memory (e.g., flash memory, flash disk, static random access memory) as well as other types of random access memories, a cache, a register, a CD-ROM, a DVD or other optical storage, a cassette tape, other magnetic storage device, or any other non-transitory medium that may be used to store information including image, data, or computer-executable instructions (e.g., stored in any format) capable of being accessed by the processor 114, or any other type of computer device. The computer program instructions may be accessed by the processor 114, read from the ROM, or any other suitable memory location, and loaded into the RAM for execution by the processor 114. For example, the memory device 116 may store one or more software applications. Software applications stored in the memory device 116 may include, for example, an operating system 143 for common computer systems as well as for software-controlled devices. Further, the memory device 116 may store an entire software application, or only a part of a software application, that is executable by the processor 114. For example, the memory device 116 may store one or more radiation therapy treatment plans 142.

The image processing device 112 may communicate with the network 120 via the communication interface 118, which may be communicatively coupled to the processor 114 and the memory device 116. The communication interface 118 may provide communication connections between the image processing device 112 and radiotherapy system 100 components (e.g., permitting the exchange of data with external devices). For instance, the communication interface 118 may, in some embodiments, have appropriate interfacing circuitry to connect to the user interface 136, which may be a hardware keyboard, a keypad, or a touch screen through which a user may input information into radiotherapy system 100.

Communication interface 118 may include, for example, a network adaptor, a cable connector, a serial connector, a USB connector, a parallel connector, a high-speed data transmission adaptor (e.g., such as fiber, USB 3.0, thunderbolt, and the like), a wireless network adaptor (e.g., such as a WiFi adaptor), a telecommunication adaptor (e.g., 3G, 4G/LTE and the like), and the like. Communication interface 118 may include one or more digital and/or analog communication devices that permit image processing device 112 to communicate with other machines and devices, such as remotely located components, via the network 120.

The network 120 may provide the functionality of a local area network (LAN), a wireless network, a cloud computing environment (e.g., software as a service, platform as a service, infrastructure as a service, etc.), a client-server, a wide area network (WAN), and the like. For example, network 120 may be a LAN or a WAN that may include other systems S1 (138), S2 (140), and S3 (141). Systems S1, S2, and S3 may be identical to image processing device 112 or may be different systems. In some embodiments, one or more systems in network 120 may form a distributed computing/simulation environment that collaboratively performs the embodiments described herein. In some embodiments, one or more systems S1, S2, and S3 may include a CT scanner that obtains CT images (e.g., medical images 146). In addition, network 120 may be connected to Internet 122 to communicate with servers and clients that reside remotely on the internet.

Therefore, network 120 may allow data transmission between the image processing device 112 and a number of various other systems and devices, such as the OIS 128, the radiation therapy device 130, and the image acquisition device 132. Further, data generated by the OIS 128 and/or the image acquisition device 132 may be stored in the memory device 116, the database 124, and/or the hospital database 126. The data may be transmitted/received via network 120, through communication interface 118 in order to be accessed by the processor 114, as required.

The image processing device 112 may communicate with database 124 through network 120 to send/receive a plurality of various types of data stored on database 124. For example, database 124 may include machine data (control points) that includes information associated with a radiation therapy device 130, image acquisition device 132, or other machines relevant to radiotherapy. Machine data information may include control points, such as radiation beam size, arc placement, beam on and off time duration, machine parameters, segments, MLC configuration, gantry speed, MRI pulse sequence, and the like. Database 124 may be a storage device and may be equipped with appropriate database administration software programs. One skilled in the art would appreciate that database 124 may include a plurality of devices located either in a central or a distributed manner.

In some embodiments, database 124 may include a processor-readable storage medium. While the processor-readable storage medium in an embodiment may be a single medium, the term "processor-readable storage medium" should be taken to include a single medium or multiple media (e.g., a centralized or distributed database, and/or associated caches and servers) that store the one or more sets of computer-executable instructions or data. The term "processor-readable storage medium" shall also be taken to include any medium that is capable of storing or encoding a set of instructions for execution by a processor and that cause the processor to perform any one or more of the methodologies of the present disclosure. The term "processor-readable storage medium" shall accordingly be taken to include, but not be limited to, solid-state memories and optical and magnetic media. For example, the processor-readable storage medium may be one or more volatile, non-transitory, or non-volatile tangible computer-readable media.

Image processor 114 may communicate with database 124 to read images into memory device 116 or store images from memory device 116 to database 124. For example, the database 124 may be configured to store a plurality of images (e.g., 3D MRI, 4D MRI, 2D MRI slice images, CT images, 2D Fluoroscopy images, X-ray images, raw data from MR scans or CT scans, Digital Imaging and Communications in Medicine (DICOM) data, projection images, graphical aperture images, etc.) that the database 124 received from image acquisition device 132. Database 124 may store data to be used by the image processor 114 when executing software program 144 or when creating radiation therapy treatment plans 142. Database 124 may store the data produced by the trained machine learning mode, such as a neural network including the network parameters constituting the model learned by the network and the resulting estimated data. As referred to herein, "estimate" or "estimated" may be used interchangeably with "predict" or "predicted" and should be understood to have the same meaning. The image processing device 112 may receive the imaging data, such as a medical image 146 (e.g., 2D MRI slice images, CT images, 2D Fluoroscopy images, X-ray images, 3DMRI images, 4D MRI images, projection images, graphical aperture images, image contours, etc.) from the database 124, the radiation therapy device 130 (e.g., a linac or an MR-linac), and/or the image acquisition device 132 to generate a treatment plan 142. The radiation therapy device 130 may provide linac based treatments such as volumetric-modulated arc therapy (VMAT) or intensity modulated radiation therapy (IMRT), for example.

In an embodiment, the radiotherapy system 100 may include an image acquisition device 132 that may acquire medical images (e.g., MRI images, 3D MRI, 2D streaming MRI, 4D volumetric MRI, CT images, cone-Beam CT, PET images, functional MRI images (e.g., fMRI, DCE-MRI, and diffusion MRI), X-ray images, fluoroscopic image, ultrasound images, radiotherapy portal images, SPECT images, and the like) of the patient. Image acquisition device 132 may, for example, be an MRI imaging device, a CT imaging device, a PET imaging device, an ultrasound device, a fluoroscopic device, a SPECT imaging device, or any other suitable medical imaging device for obtaining one or more medical images of the patient. Images acquired by the image acquisition device 132 may be stored within database 124 as either imaging data and/or test data. By way of example, the images acquired by the image acquisition device 132 may be also stored by the image processing device 112 as medical images 146 in memory device 116.

In an embodiment, for example, the image acquisition device 132 may be integrated with the radiation therapy device 130 as a single apparatus (e.g., an MR-linac). Such an MR-linac may be used, for example, to determine a location of a target organ or a target tumor in the patient, so as to direct radiation therapy accurately according to the radiation therapy treatment plan 142 to a predetermined target.

The image acquisition device 132 may be configured to acquire one or more images, such as including spatial imaging data, of the patient's anatomy for a region of interest (e.g., a target organ, a target tumor, or both). Each image, typically a 2D image or slice, may include one or more parameters (e.g., a 2D slice thickness, an orientation, and a location, etc.). In an embodiment, the image acquisition device 132 may acquire a 2D slice in any orientation. For example, an orientation of the 2D slice may include a sagittal orientation, a coronal orientation, or an axial orientation. The processor 114 may adjust one or more parameters, such as the thickness and/or orientation of the 2D slice, to include the target organ and/or target tumor. In an embodiment, 2D slices may be determined from information such as a 3D MRI volume. Such 2D slices may be acquired by the image acquisition device 132 in "real-time" while a patient is undergoing radiation therapy treatment, for example, when using the radiation therapy device 130, with "real-time" meaning acquiring the data in at least milliseconds or less. The image acquisition device 132 may be configured to acquire 3D spatial imaging data.

The image processing device 112 may generate and store radiation therapy treatment plans 142 for one or more patients. The radiation therapy treatment plans 142 may provide information about a particular radiation dose to be applied to each patient. The radiation therapy treatment plans 142 may also include other radiotherapy information, such as control points including beam angles, gantry angles, beam intensity, dose-histogram-volume information, the number of radiation beams to be used during therapy, the dose per beam, and the like.

The image processor 114 may generate the radiation therapy treatment plan 142 by using software programs 144 such as treatment planning software (such as Leksell Gamma Plan® Monaco®, manufactured by Elekta, Sweden). In order to generate the radiation therapy treatment plans 142, the image processor 114 may communicate with the image acquisition device 132 (e.g., a CT device, an MRI device, a PET device, an X-ray device, an ultrasound device, etc.) to access images of the patient and to delineate a target, such as a tumor, to generate contours of the images. In some embodiments, the delineation of one or more OARs, such as healthy tissue surrounding the tumor or in close proximity to the tumor, may be required. Therefore, segmentation of the OAR may be performed when the OAR is close to the target tumor. In addition, if the target tumor is close to the OAR (e.g., prostate in near proximity to the bladder and rectum), then by segmenting the OAR from the tumor, the radiotherapy system 100 may study the dose distribution not only in the target but also in the OAR.

In order to delineate a target organ or a target tumor from the OAR, medical images, such as MRI images, CT images, PET images, fMRI images, X-ray images, ultrasound images, radiotherapy portal images, SPECT images, and the like, of the patient undergoing radiotherapy may be obtained non-invasively by the image acquisition device 132 to reveal the internal structure of a body part. Based on the information from the medical images, a 3D structure of the relevant anatomical portion may be obtained and used to generate a contour of the image. Contours of the image may include data overlaid on top of the image that delineates one or more structures of the anatomy. In some cases, the contours may be files associated with respective images that specify the coordinates or 2D or 3D locations of various structures of the anatomy depicted in the images.

In addition, during a treatment planning process, many parameters may be taken into consideration to achieve a balance between efficient treatment of the target tumor (e.g., such that the target tumor receives enough radiation dose for an effective therapy) and low irradiation of the OAR(s) (e.g., the OAR(s) receives as low a radiation dose as possible). Other parameters that may be considered include the location of the target organ and the target tumor, the location of the OAR, and the movement of the target in relation to the OAR. For example, the 3D structure may be obtained by contouring the target or contouring the OAR within each 2D layer or slice of an MRI or CT image and combining the contour of each 2D layer or slice. The contour may be generated manually (e.g., by a physician, dosimetrist, or health care worker using a program such as Leksell Gamma Plan® manufactured by Elekta) or automatically (e.g., using a program such as the Atlas-based auto-segmentation software, ABAS™, manufactured by Elekta). In certain embodiments, the 3D structure of a target tumor or an OAR may be generated automatically by the treatment planning software.

After the target tumor and the OAR(s) have been located and delineated, a dosimetrist, physician, or healthcare worker may determine a dose of radiation to be applied to the target tumor, as well as any maximum amounts of dose that may be received by the OAR proximate to the tumor (e.g., left and right parotid, optic nerves, eyes, lens, inner ears, spinal cord, brain stem, and the like). After the radiation dose is determined for each anatomical structure (e.g., target tumor, OAR), a process known as inverse planning may be performed to determine one or more treatment plan parameters that would achieve the desired radiation dose distribution. Examples of treatment plan parameters include volume delineation parameters (e.g., which define target volumes, contour sensitive structures, etc.), margins around the target tumor and OARs, beam angle selection, collimator settings, and beam-on times.

During the inverse-planning process, the physician may define dose constraint parameters that set bounds on how much radiation an OAR may receive (e.g., defining full dose to the tumor target and zero dose to any OAR; defining dose received by at least 95% of the target tumor volume; defining that the spinal cord, brain stem, and optic structures receive ≤45Gy, ≤55Gy and <54Gy, respectively). The result of inverse planning may constitute a radiation therapy treatment plan 142 that may be stored in memory device 16 or database 124. Some of these treatment parameters may be correlated. For example, tuning one parameter (e.g., weights for different objectives, such as increasing the dose to the target tumor) in an attempt to change the treatment plan may affect at least one other parameter, which in turn may result in the development of a different treatment plan. Thus, the image processing device 112 may generate a tailored radiation therapy treatment plan 142 having these parameters in order for the radiation therapy device 130 to provide radiotherapy treatment to the patient.

In addition, the radiotherapy system 100 may include a display device 134 and a user interface 136. The display device 134 may include one or more display screens that display medical images, interface information, treatment planning parameters (e.g., projection images, graphical aperture images, contours, dosages, beam angles, etc.) treatment plans, a target, localizing a target and/or tracking a target, or any related information to the user. The user interface 136 may be a keyboard, a keypad, a touch screen, or any type of device that a user may use to input information to radiotherapy system 100. Alternatively, the display device 134 and the user interface 136 may be integrated into a device such as a tablet computer (e.g., Apple iPad®, Lenovo Thinkpad®, Samsung Galaxy®, etc.).

Furthermore, any and all components of the radiotherapy system 100 may be implemented as a virtual machine (e.g., VMWare, Hyper-V, and the like). For instance, a virtual machine may be software that functions as hardware. Therefore, a virtual machine may include at least one or more virtual processors, one or more virtual memories, and one or more virtual communication interfaces that together function as hardware. For example, the image processing device 112, the OIS 128, and the image acquisition device 132 could be implemented as a virtual machine. Given the processing power, memory, and computational capability available, the entire radiotherapy system 100 could be implemented as a virtual machine.

Using various techniques of this disclosure, a system, such as the radiotherapy system 100, may acquire 3D spatial imaging data, e.g., data representing an image of a patient. Based on imaging parameters, such as image voxel gray values or gradients, and guided by user input of locations in the 3D spatial imaging data, e.g., such as by movement of a mouse our other input device, techniques for 3D contouring of a region of interest of the patient, e.g., the organ or other structure, can be performed.

Figure 2A:
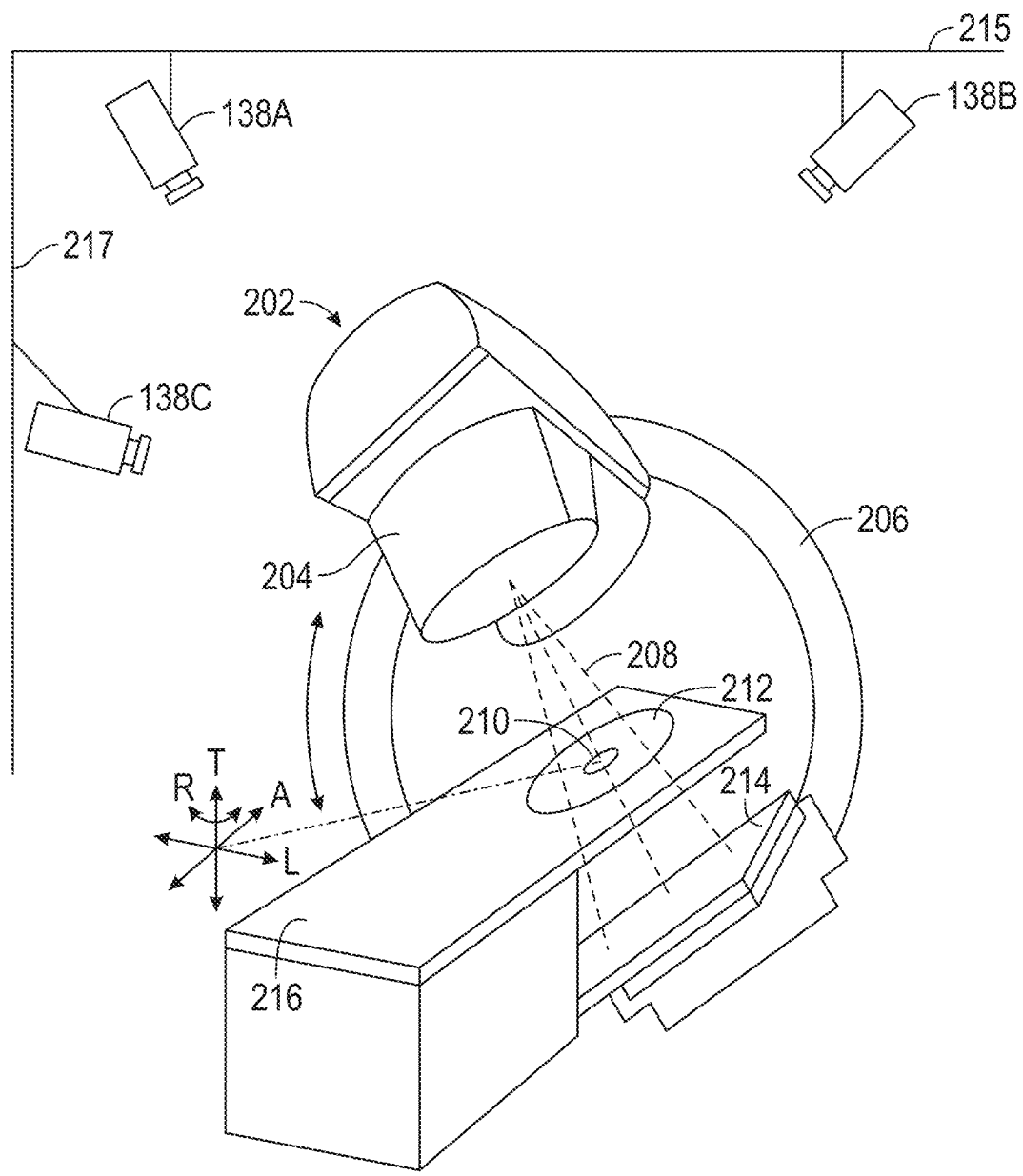
FIG. 2A illustrates an example a radiation therapy system that may include radiation therapy output configured to provide a therapy beam, according to some embodiments of the present disclosure.

FIG. 2A illustrates an example of a radiation therapy device 202 that may include a radiation source, such as an X-ray source or a linear accelerator, a couch 216, an imaging detector 214, and a radiation therapy output 204. The radiation therapy device 202 may be configured to emit a radiation beam 208 to provide therapy to a patient. The radiation therapy output 204 may include one or more attenuators or collimators, such as an MLC as described in the illustrative embodiment of FIG. 5, below.

Referring back to FIG. 2A, a patient may be positioned in a region 212 and supported by the treatment couch 216 to receive a radiation therapy dose, according to a radiation therapy treatment plan. The radiation therapy output 204 may be mounted or attached to a gantry 206 or other mechanical support. One or more chassis motors (not shown) may rotate the gantry 206 and the radiation therapy output 204 around couch 216 when the couch 216 is inserted into the treatment area. In an embodiment, gantry 206 may be continuously rotatable around couch 216 when the couch 216 is inserted into the treatment area. In another embodiment, gantry 206 may rotate to a predetermined position when the couch 216 is inserted into the treatment area. For example, the gantry 206 may be configured to rotate the therapy output 204 around an axis ("A"). Both the couch 216 and the radiation therapy output 204 may be independently moveable to other positions around the patient, such as moveable in transverse direction ("T"), moveable in a lateral direction ("L"), or as rotation about one or more other axes, such as rotation about a transverse axis (indicated as "R"). A controller communicatively connected to one or more actuators (not shown) may control the couch's 216 movements or rotations in order to properly position the patient in or out of the radiation beam 208 according to a radiation therapy treatment plan. Both the couch 216 and the gantry 206 are independently moveable from one another in multiple degrees of freedom, which allows the patient to be positioned such that the radiation beam 208 may precisely target the tumor. The MLC may be integrated and included within gantry 206 to deliver the radiation beam 208 of a certain shape.

The coordinate system (including axes A, T, and L) shown in FIG. 2A may have an origin located at an isocenter 210. The isocenter 210 may be defined as a location where the central axis of the radiation beam 208 intersects the origin of a coordinate axis, such as to deliver a prescribed radiation dose to a location on or within a patient. Alternatively, the isocenter 210 may be defined as a location where the central axis of the radiation beam 208 intersects the patient for various rotational positions of the radiation therapy output 204 as positioned by the gantry 206 around the axis A. As discussed herein, the gantry angle corresponds to the position of gantry 206 relative to axis A, although any other axis or combination of axes may be referenced and used to determine the gantry angle.

Gantry 206 may also have an attached imaging detector 214. The imaging detector 214 is preferably located opposite to the radiation source, and in an embodiment, the imaging detector 214 may be located within a field of the therapy beam 208.

The imaging detector 214 may be mounted on the gantry 206 (preferably opposite the radiation therapy output 204), such as to maintain alignment with the therapy beam 208. The imaging detector 214 rotates about the rotational axis as the gantry 206 rotates. In an embodiment, the imaging detector 214 may be a flat panel detector (e.g., a direct detector or a scintillator detector). In this manner, the imaging detector 214 may be used to monitor the therapy beam 208 or the imaging detector 214 may be used for imaging the patient's anatomy, such as portal imaging (e.g., to provide real X-ray measurements). The control circuitry of radiation therapy device 202 may be integrated within system 100 or remote from it.

In an illustrative embodiment, one or more of the couch 216, the therapy output 204, or the gantry 206 may be automatically positioned, and the therapy output 204 may establish the therapy beam 208 according to a specified dose for a particular therapy delivery instance. A sequence of therapy deliveries may be specified according to a radiation therapy treatment plan, such as using one or more different orientations or locations of the gantry 206, couch 216, or therapy output 204. The therapy deliveries may occur sequentially, but may intersect in a desired therapy locus on or within the patient, such as at the isocenter 210. A prescribed cumulative dose of radiation therapy may thereby be delivered to the therapy locus while damage to tissue near the therapy locus may be reduced or avoided.

In some examples, surface camera imaging data may be acquired using one or more surface cameras 138A-138C. FIG. 2A depicts one non-limiting example in which one or more surface cameras 138A, 138B may be affixed to a ceiling 215 in the therapy treatment room and/or one or more surface cameras 138C may be affixed to a wall 217 in the therapy treatment room. One or more of the surface cameras 138A-138C may acquire surface camera imaging data in real time. The surface camera imaging data from one or more of the surface cameras 138A-138C may then be transmitted to an image processing device, such as to the image processing device 112 of FIG. 1, to generate a model.

Figure 2B:
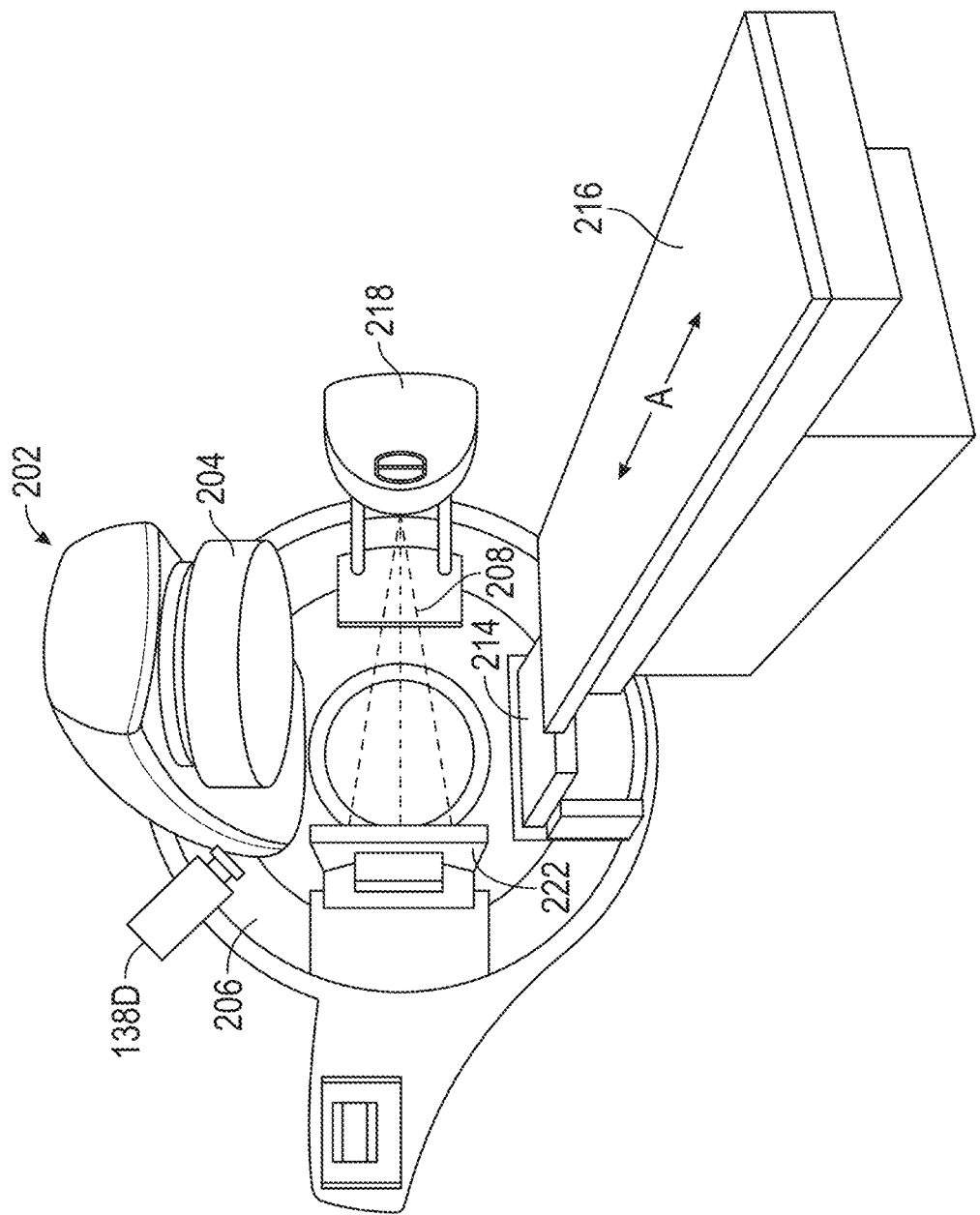
FIG. 2B illustrates an example of a system including a combined radiation therapy system and an imaging system, such as a cone beam computed tomography (CBCT) imaging system, according to some embodiments of the present disclosure.

FIG. 2B illustrates an example of a radiation therapy device 202 that may include a combined linac and an imaging system, such as may include a CT imaging system. The radiation therapy device 202 may include an MLC (not shown). The CT imaging system may include an imaging X-ray source 218, such as providing X-ray energy in a kiloelectron-Volt (keV) energy range which may be used for imaging the patient's anatomy, such as portal imaging (e.g., to provide real X-ray measurements). The imaging X-ray source 218 (also referred to as a "kV source" for kV imaging) may provide a fan-shaped and/or a conical beam 208 directed to an imaging detector 222, such as a flat panel detector. The radiation therapy device 202 may be similar to the system described in relation to FIG. 2A, such as including a radiation therapy output 204, a gantry 206, a couch 216, and another imaging detector 214 (such as a flat panel detector). The X-ray source 218 may provide a comparatively-lower-energy X-ray diagnostic beam, for imaging.

In the illustrative embodiment of FIG. 2B, the radiation therapy output 204, e.g., MV source, and the X-ray source 218, e.g., kV source, may be mounted on the same rotating gantry 206, rotationally-separated from each other by 90 degrees. This arrangement may enable imaging perpendicular to the beam of radiation output by radiation therapy output 204, which, in some embodiments, may be a Megavolt (MV) treatment beam. The kV source 218 may be used to acquire 2D X-ray projections for kV imaging as the kV source 218 moves around the patient along gantry 206.

In another embodiment, two or more X-ray sources may be mounted along the circumference of the gantry 206, such as each having its own detector arrangement to provide multiple angles of diagnostic imaging concurrently. Similarly, multiple radiation therapy outputs 204 may be provided.

FIG. 2B depicts another non-limiting example in which one or more surface cameras 138D may acquire surface camera imaging data. In the example shown in FIG. 2B, a surface camera 138D may be affixed to a frontside of a radiation therapy device 202, such as to a frontside of a CT bore and another surface camera may be affixed to a backside of the radiation therapy device 202, such as to a backside of a CT bore. In this manner, the surface cameras may provide a continuous view of the patient. The surface camera imaging data from the surface cameras, such as the surface camera 138D and a backside surface camera may then be transmitted to an image processing device, such as to the image processing device 112 of FIG. 1, to generate a model.

Figure 3:
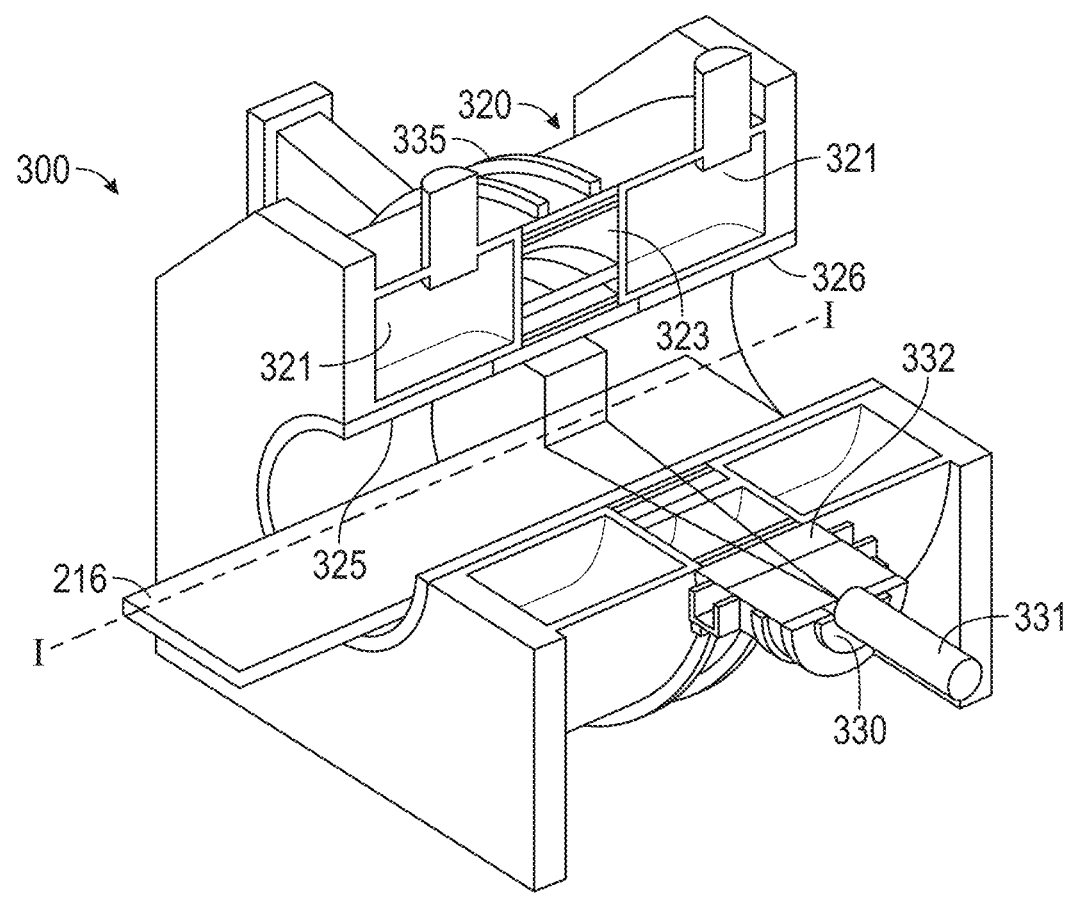
FIG. 3 illustrates a partially cut-away view of an example system including a combined radiation therapy system and an imaging system, such as a nuclear MR imaging (MRI) system, according to some embodiments of the present disclosure.
Figure 4B:
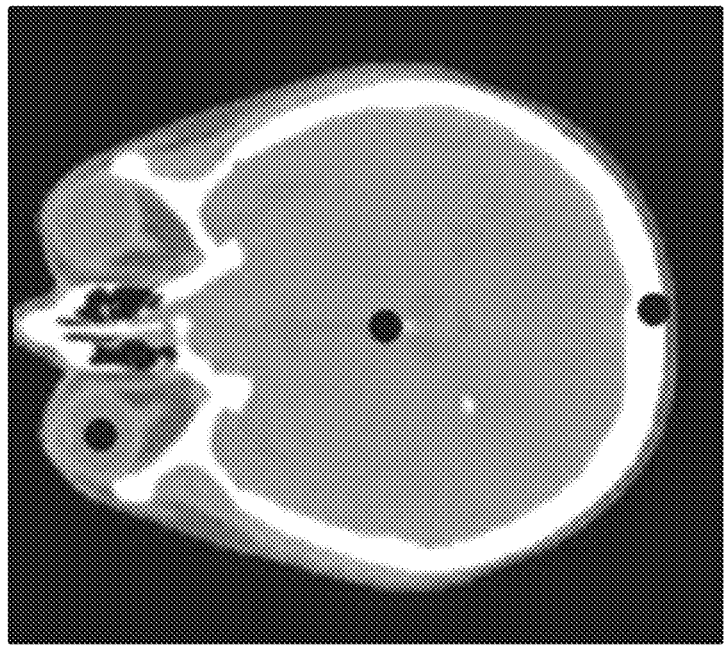
FIGS. 4A and 4B depict the differences between an example MRI image and a corresponding CT image, respectively, according to some embodiments of the present disclosure.
Figure 4A:
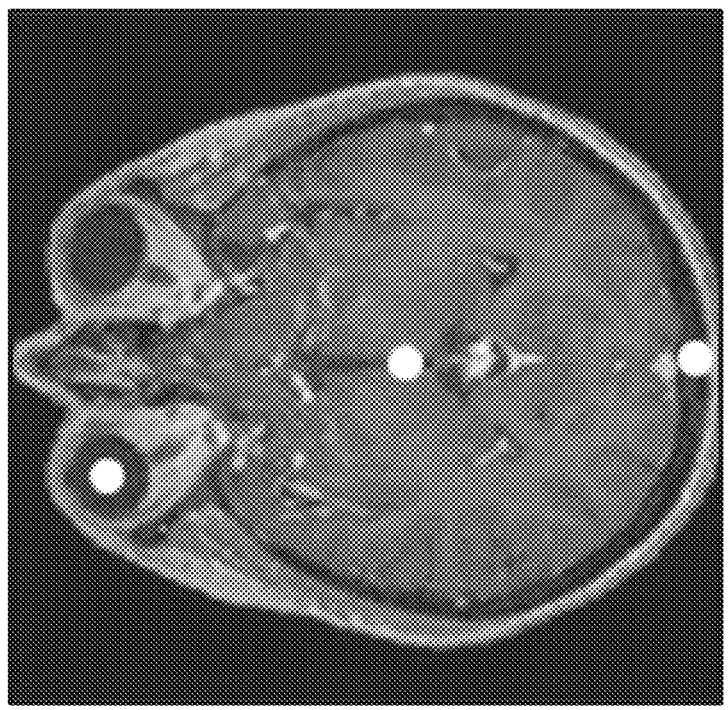

FIG. 3 depicts an example radiation therapy system 300 that may include combining a radiation therapy device 202 and an imaging system, such as a nuclear MR imaging system (e.g., known in the art as an MR-linac) consistent with the disclosed embodiments. As shown, system 300 may include a couch 216, an image acquisition device 320, and a radiation delivery device 330. System 300 delivers radiation therapy to a patient in accordance with a radiotherapy treatment plan. In some embodiments, image acquisition device 320 may correspond to image acquisition device 132 in FIG. 1 that may acquire origin images of a first modality (e.g., MRI image shown in FIG. 4A) or destination images of a second modality (e.g., CT image shown in FIG. 4B).

Couch 216 may support a patient (not shown) during a treatment session. In some implementations, couch 216 may move along a horizontal translation axis (labelled "I"), such that couch 216 may move the patient resting on couch 216 into and/or out of system 300. Couch 216 may also rotate around a central vertical axis of rotation, transverse to the translation axis. To allow such movement or rotation, couch 216 may have motors (not shown) enabling the couch 216 to move in various directions and to rotate along various axes. A controller (not shown) may control these movements or rotations in order to properly position the patient according to a treatment plan.

In some embodiments, image acquisition device 320 may include an MRI machine used to acquire 2D or 3D MRI images of the patient before, during, and/or after a treatment session. Image acquisition device 320 may include a magnet 321 for generating a primary magnetic field for magnetic resonance imaging. The magnetic field lines generated by operation of magnet 321 may run substantially parallel to the central translation axis I. Magnet 321 may include one or more coils with an axis that runs parallel to the translation axis I. In some embodiments, the one or more coils in magnet 321 may be spaced such that a central window 323 of magnet 321 is free of coils. In other embodiments, the coils in magnet 321 may be thin enough or of a reduced density such that they are substantially transparent to radiation of the wavelength generated by radiotherapy device 330. Image acquisition device 320 may also include one or more shielding coils, which may generate a magnetic field outside magnet 321 of approximately equal magnitude and opposite polarity in order to cancel or reduce any magnetic field outside of magnet 321. As described below, radiation source 331 of radiotherapy device 330 may be positioned in the region where the magnetic field is cancelled, at least to a first order, or reduced.

Image acquisition device 320 may also include three sets of gradient coils, which may generate magnetic field gradients that are superimposed on the primary magnetic field. Each set of gradient coils may generate a gradient along a corresponding one of the x-axis, y-axis, and z-axis. Each gradient coil may include two sections, shown at reference numbers 325 and 326. All three sets of gradient coils may be physically located at reference numbers 325 and 326.

The gradient coils may generate a gradient in the resultant magnetic field that allows spatial encoding of the protons so that their position may be determined. The gradient coils may be positioned around a common central axis with the magnet 321.

In some embodiments, image acquisition device 320 may be an imaging device other than an MRI, such as an X-ray, a CT, a CBCT, a spiral CT, a PET, a SPECT, an optical tomography, a fluorescence imaging, ultrasound imaging, radiotherapy portal imaging device, or the like. As would be recognized by one of ordinary skill in the art, the above description of image acquisition device 320 concerns certain embodiments and is not intended to be limiting.

Radiotherapy device 330 may include the radiation source 331, such as an X-ray source or a linac, and an MLC 332 (shown below in FIG. 5). Radiotherapy device 330 may be mounted on a chassis 335. One or more chassis motors (not shown) may rotate chassis 335 around couch 216 when couch 216 is inserted into the treatment area. In an embodiment, chassis 335 may be continuously rotatable around couch 216 when couch 216 is inserted into the treatment area. Chassis 335 may also have an attached radiation detector (not shown), preferably located opposite to radiation source 331 and with the rotational axis of chassis 335 positioned between radiation source 331 and the detector. Further, device 330 may include control circuitry (not shown) used to control, for example, one or more of couch 216, image acquisition device 320, and radiotherapy device 330. The control circuitry of radiotherapy device 330 may be integrated within system 300 or remote from it.

During a radiotherapy treatment session, a patient may be positioned on couch 216. System 300 may then move couch 216 into the treatment area defined by magnet 321, coils 325 and 326, and chassis 335. Control circuitry may then control radiation source 331, MLC 332, and the chassis motor(s) to deliver radiation to the patient through the window between coils 325 and 326 according to a radiotherapy treatment plan.

FIG. 2A, FIG. 2B, and FIG. 3 illustrate generally embodiments of a radiation therapy device configured to provide radiotherapy treatment to a patient, including a configuration where a radiation therapy output may be rotated around a central axis (e.g., an axis "A"). Other radiation therapy output configurations may be used. For example, a radiation therapy output may be mounted to a robotic arm or manipulator having multiple degrees of freedom. In yet another embodiment, the therapy output may be fixed, such as located in a region laterally separated from the patient, and a platform supporting the patient may be used to align a radiation therapy isocenter with a specified target locus within the patient.

As discussed above, radiation therapy devices described by FIG. 2A, FIG. 2B, and FIG. 3 include an MLC for shaping, directing, or modulating an intensity of a radiation therapy beam to the specified target locus within the patient.

FIG. 5 illustrates an example of an MLC 332 that includes leaves 532A through 532J that may be automatically positioned to define an aperture approximating a tumor 540 cross section or projection. The leaves 532A through 532J permit modulation of the radiation therapy beam. The leaves 532A through 532J may be made of a material specified to attenuate or block the radiation beam in regions other than the aperture, in accordance with the radiation treatment plan. For example, the leaves 532A through 532J may include metallic plates, such as comprising tungsten, with a long axis of the plates oriented parallel to a beam direction and having ends oriented orthogonally to the beam direction (as shown in the plane of the illustration of FIG. 2A). A "state" of the MLC 332 may be adjusted adaptively during a course of radiation therapy treatment, such as to establish a therapy beam that better approximates a shape or location of the tumor 540 or another target locus. This is in comparison to using a static collimator configuration or as compared to using an MLC 332 configuration determined exclusively using an "offline" therapy planning technique. A radiation therapy technique using the MLC 332 to produce a specified radiation dose distribution to a tumor or to specific areas within a tumor may be referred to as IMRT.

Figure 6:
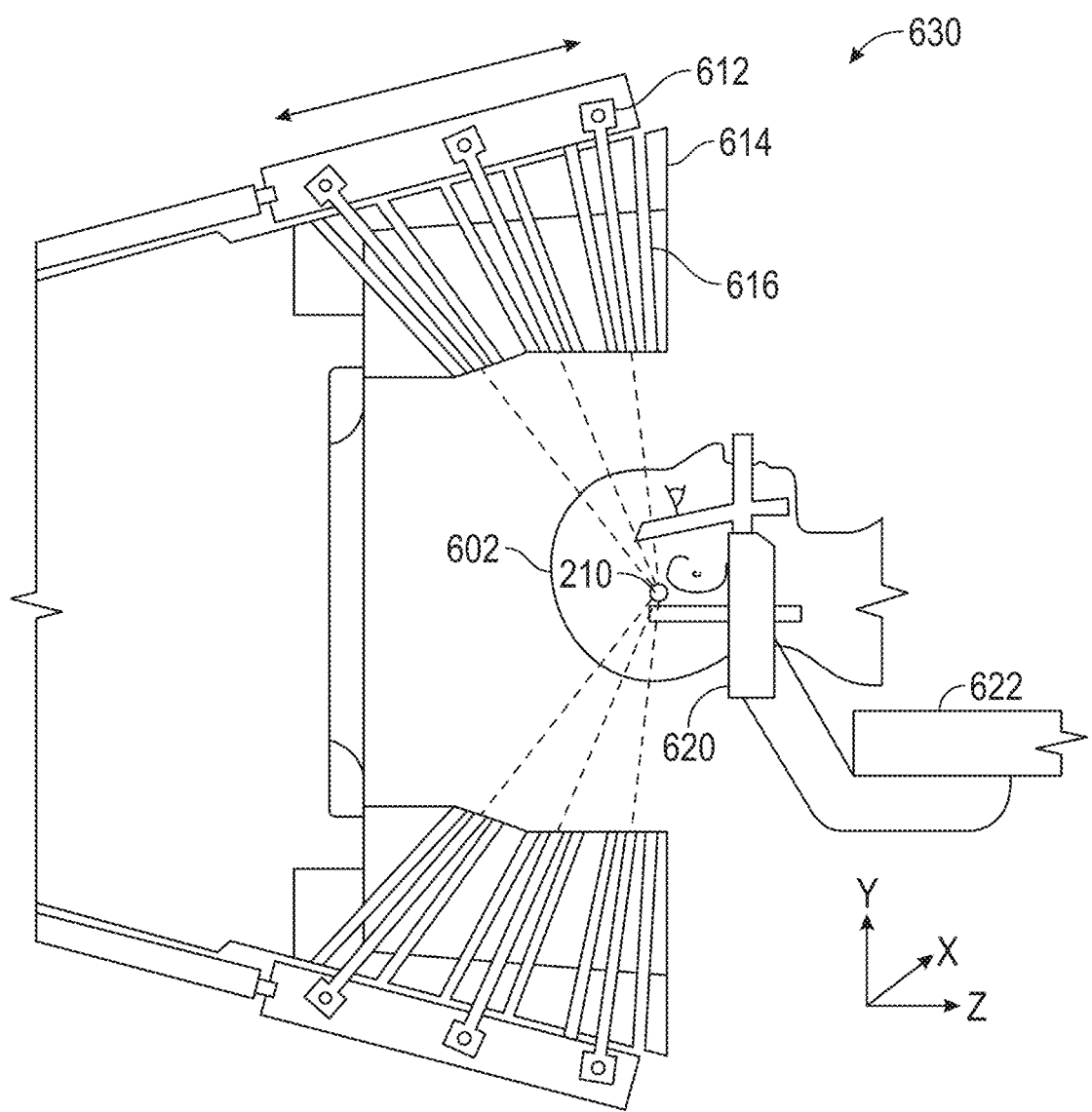
FIG. 6 illustrates an example of a Gamma Knife® radiation therapy system, according to some embodiments of the present disclosure.

FIG. 6 illustrates an embodiment of another type of radiotherapy device 630 (e.g., a Leksell Gamma Knife®), according to some embodiments of the present disclosure. As shown in FIG. 6, in a radiotherapy treatment session, a patient 602 may wear a coordinate frame 620 to keep stable the patient's body part (e.g., the head) undergoing surgery or radiotherapy. Coordinate frame 620 and a patient positioning system 622 may establish a spatial coordinate system, which may be used while imaging a patient or during radiation surgery. Radiotherapy device 630 may include a protective housing 614 to enclose a plurality of radiation sources 612. Radiation sources 612 may generate a plurality of radiation beams (e.g., beamlets) through beam channels 616. The plurality of radiation beams may be configured to focus on an isocenter 210 from different directions. While each individual radiation beam may have a relatively low intensity, isocenter 210 may receive a relatively high level of radiation when multiple doses from different radiation beams accumulate at isocenter 210. In certain embodiments, isocenter 210 may correspond to a target under surgery or treatment, such as a tumor.

In radiation treatment planning, using a computer system configured with software for allowing a physician or other user to perform manual structure contouring (e.g., of a region of interest (ROI) or organ-at-risk (OAR)) and manual contour editing, such user-driven contouring, may be a time-consuming process. Structure contouring and contour editing may be done in two-dimensional imaging data (2D) (e.g., processing one image slice at a time) or three-dimensional imaging data (3D) (e.g., processing multiple image slices at the same time). Contouring in 3D should advantageously be faster than contouring in 2D. Using a computer-implemented paint brush tool may also have the advantage of producing structure contours that are smoother-looking than using a computer-implemented pencil-drawing tool for contouring on a computer display, producing contours that better represent the reality that organs in the human body have smooth surfaces. Contouring in 3D also has the advantage of considerably reducing the slice-to-slice jaggedness inherent in 2D contouring, such as shown in FIG. 7.

Figure 7:
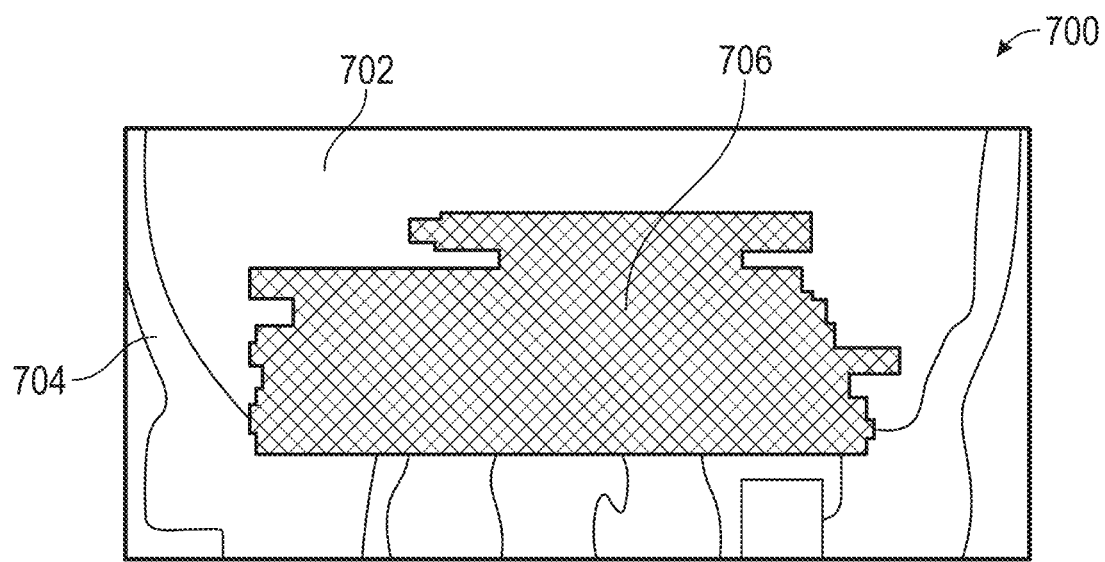
FIG. 7 is a screenshot of a portion of a region of interest of a patient.

FIG. 7 is a screenshot of a portion of a region of interest of a patient. The screenshot 700 of FIG. 7 depicts a region of interest 702, including a structure 704, e.g., organ or bone, having a boundary, and a contour 706. FIG. 7 depicts the slice-to-slice contour jaggedness that may occur in a coronal view when the user contours one slice at a time with a 2D paint brush in transverse views.

Further, while contouring or editing existing contours, the user has to move the mouse slowly (e.g., to paint or draw) to make the contours align with the underlying anatomy accurately. Therefore, even in 3D, this process may remain time-consuming and may involve constant attention on the part of the user. The present inventor has recognized, among other things, that a contouring and contour editing tool that allows the user to move the mouse more rapidly and that does not require constant attention would represent important time savings, which, in turn will help reduce the cost and improve the quality of medical care.

One approach to computer-assisted radiation treatment planning may provide a 2D paint brush computer tool with a 2D edge-detection tool. In an example, such a tool may be used to paint by placing a circle centered on the mouse location, and by finding potential organ boundary points radially from the center of the circle. As a result, the organ boundary found by the system and shown to the user may be jagged, such as shown in FIG. 8.

Figure 8:
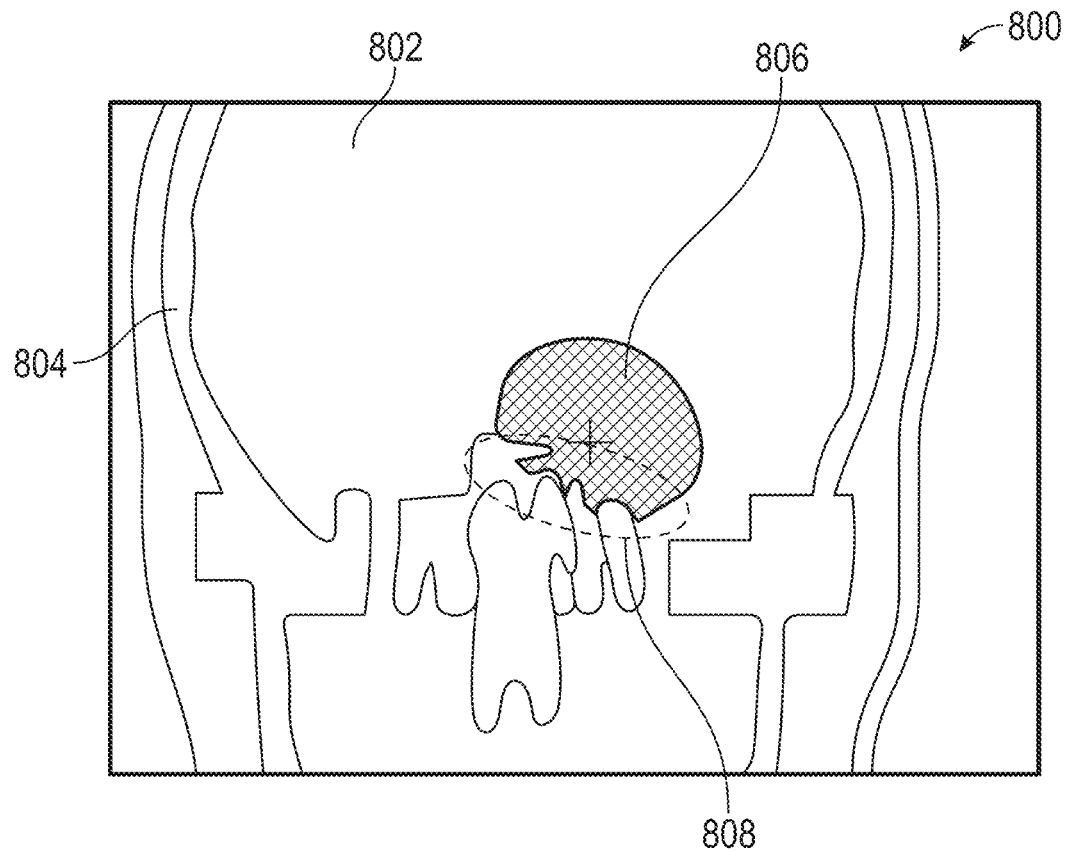
FIG. 8 is another screenshot of a portion of a region of interest of a patient.

FIG. 8 is another screenshot of a portion of a region of interest of a patient. The screenshot 800 of FIG. 8 depicts a region of interest 802, including a structure 804, e.g., organ or bone, having a boundary, and a contour 806. A paint brush tool may be used to generate a generally circular contour 806. But, as shown at region 808, the paint brush tool generates a jagged boundary of the structure 804, e.g., organ. This may also lead to undesirable jagged structure contours, such as shown in FIG. 9.

Figure 9:
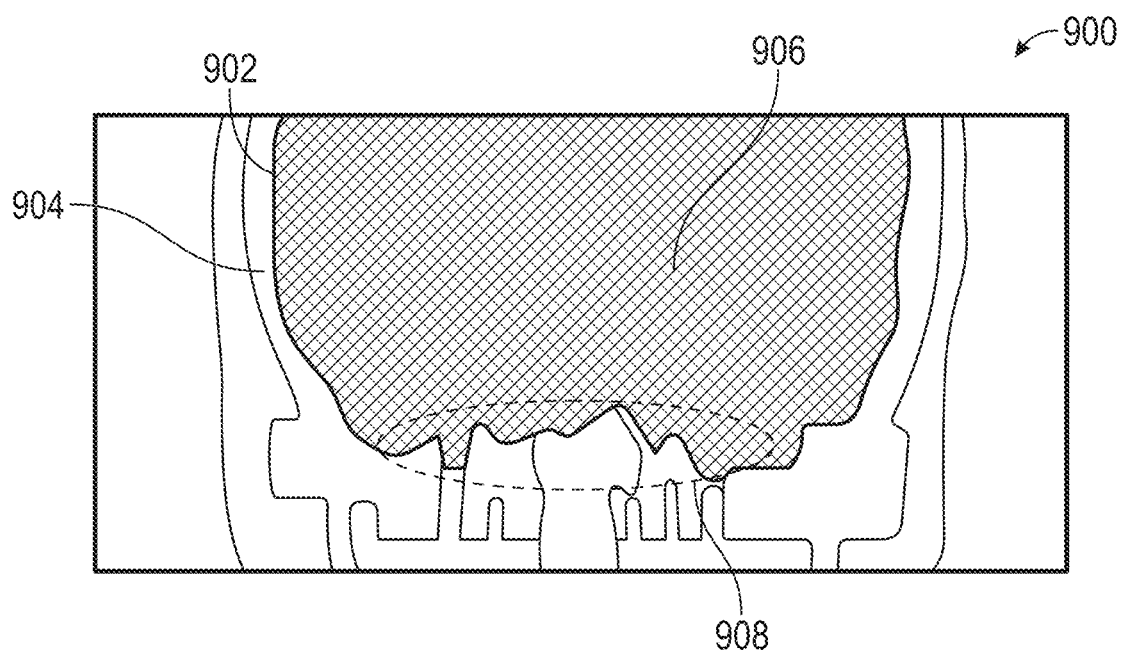
FIG. 9 is another screenshot of a portion of a region of interest of a patient.

FIG. 9 is another screenshot of a portion of a region of interest of a patient. The screenshot 900 of FIG. 9 depicts a region of interest 902, including a structure 904, e.g., organ or bone, having a boundary, and a contour 906. A user has used a paint brush tool to find potential organ boundary points, which resulted in a jagged structure contour displayed to the user, as shown at region 908.

Figure 10:
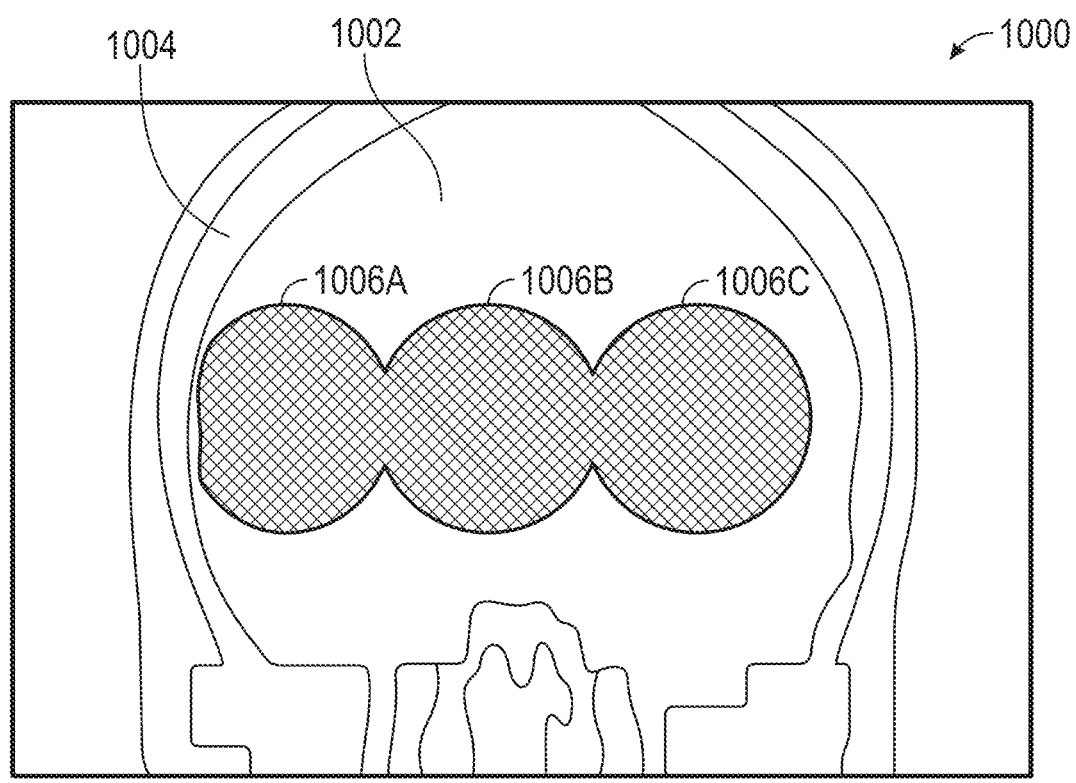
FIG. 10 is another screenshot of a portion of a region of interest of a patient.

FIG. 10 is another screenshot of a portion of a region of interest of a patient. The screenshot 1000 of FIG. 10 depicts a region of interest 1002, including a structure 1004, e.g., organ or bone, having a boundary, and contours 1006A-1006C. If the user were to move the mouse very quickly, the system may not respond quickly enough to execute the painting routine every time the user moves the mouse by a single monitor pixel. This may lead to the painting routine not being executed often enough, thereby producing contours 1006A-1006B.

While it may be possible for a graphics processor of the computer to generally be fast enough to be able to execute such a painting routine almost every time the user moves the mouse by a single monitor pixel, a 3D extension of this edge-detection algorithm, e.g., that corrects for both the jagged contours and the painting routine not being executed often enough may not be fast enough.

This disclosure is directed to, among other things, techniques for 3D contouring of a region of interest based on imaging parameters of 3D spatial imaging data and guided by user input of locations in the 3D spatial imaging data, which may be used for segmentation or radiation treatment planning. The disclosure describes an approach of combining a new 3D paint brush tool with an edge-detection algorithm to correct for both the jagged contours and the painting routine not being executed often enough. By painting in 3D, the user saves time. And by using an edge-detection algorithm, the user does not need to focus as much attention on moving the mouse accurately because the system will find the true organ boundary (e.g., using the image gradient) automatically, which may also lead to more time savings.

This new 3D paint brush tool need not use a simple sphere such as would lead to contours similar to those shown in FIG. 10. Instead of executing the 3D painting routine using a sphere placed at the mouse location, a 3D shape may be created using the current mouse location and the mouse location at the time the painting routine was last executed or, in other words, receiving first and second location seed points from the user via user input received in conjunction with corresponding displayed spatial imaging data, e.g., an image of an organ or other region of interest.

Figure 11:
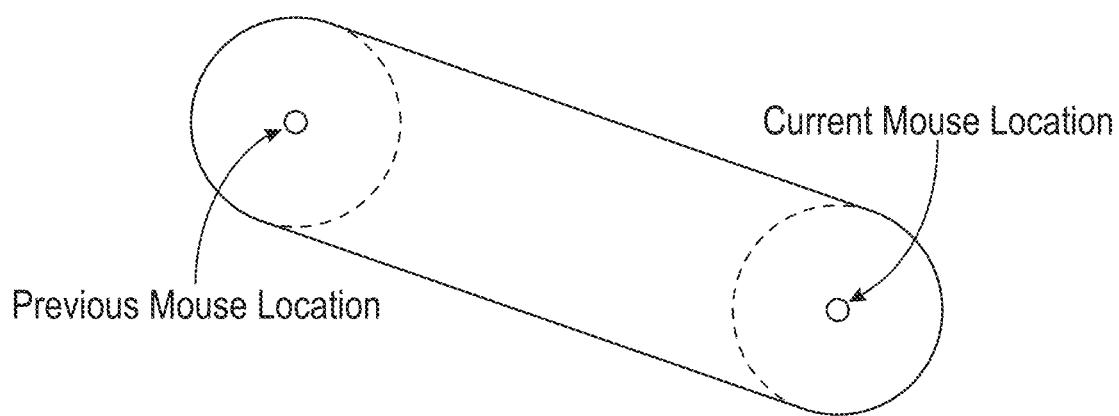
FIG. 11 is a conceptual diagram of a 2D version of a convex hull of the union between a circle placed at a current mouse location, and another circle at the mouse location at the time the painting routine was last executed.

The system may define a seed axis extending between the first and second location seed points and create a union of the two spheres (one placed at the current mouse location, and the other at the mouse location at the time the painting routine was last executed). By creating the union of those two spheres, and creating a convex hull of that union, the effect shown in FIG. 10 may be eliminated. An example of a 2D version of such a shape is shown in FIG. 11. As described below, the system may perform edge detecting for a 3D boundary of the region of interest via an edge detection algorithm using the imaging parameter of the 3D spatial imaging data and using rays extending outward perpendicular to the seed axis or perpendicular to first or second semi-spheres defined using the first and second seed locations, and smooth the paint brush shape via a mesh smoothing algorithm.

FIG. 11 is a conceptual diagram of a 2D version of a convex hull of the union between a circle placed at a current mouse location, and another circle at the mouse location at the time the painting routine was last executed. The 3D extension of the 2D shape shown in FIG. 11 is a cylinder that starts at the mouse location at the time the painting routine was last executed (the "previous mouse location", in FIG. 11) and ends at the current mouse location, such as with each end of that cylinder capped with a half sphere.

The 3D extension of the edge detection algorithm applied to this new 3D shape involves searching within the surface mesh radially along a plurality of rays in 3D for potential organ boundary points. For the radial rays that intersect the half spheres at the ends of the 3D shape, the search for potential organ boundary points is performed along rays that start at the center of the sphere (the "previous mouse location" or "current mouse location", respectively, for each half sphere). And for the rays that intersect the cylindrical mid-section of the shape, the search for potential organ boundary points may be performed radially along rays that are perpendicular to the longitudinal axis of the cylinder.

In an example, the system may internally represent the paint brush shape for the 3D contouring used as a surface mesh, such as a triangulated or other polygonal surface mesh (e.g., a surface mesh constructed of contiguous planar triangles or other polygons), and the search for potential organ boundary points may be performed along rays that intersect the vertices of that surface mesh. See, e.g., Szalay et al., "Indexing The Sphere With the Hierarchical Triangular Mesh," Microsoft Technical Report MSR-TR-2005-123 (August 2005) (https://arxiv.org/ftp/cs/papers/0701/0701164.pdf), which is incorporated herein by reference. In other words, a surface mesh of triangles may be used to define a paint brush shape that does not extend beyond the 3D boundary of the region of interest. The surface mesh may include a plurality of rays and have a center located at a position of a cursor controlled by the user.

Once potential organ boundary points are found, such as by using an edge detection such as may be based on an imaging parameters (e.g., image voxel gray values or density gradients) of 3D spatial imaging data of the potential organ (or other region of interest) along a plurality of rays of a surface mesh, the system may implement a 3D extension of an active contour algorithm, such as by creating an energy equation that represents a combination of external and internal energies in the system defined by the triangulated surface mesh and the imaging data, and by finding the minimum of that energy equation. In such a way, the jaggedness of the shape used by the painting routine is removed, and the contours produced represent the reality that organs in the human body generally have smooth surfaces.

Figure 12:
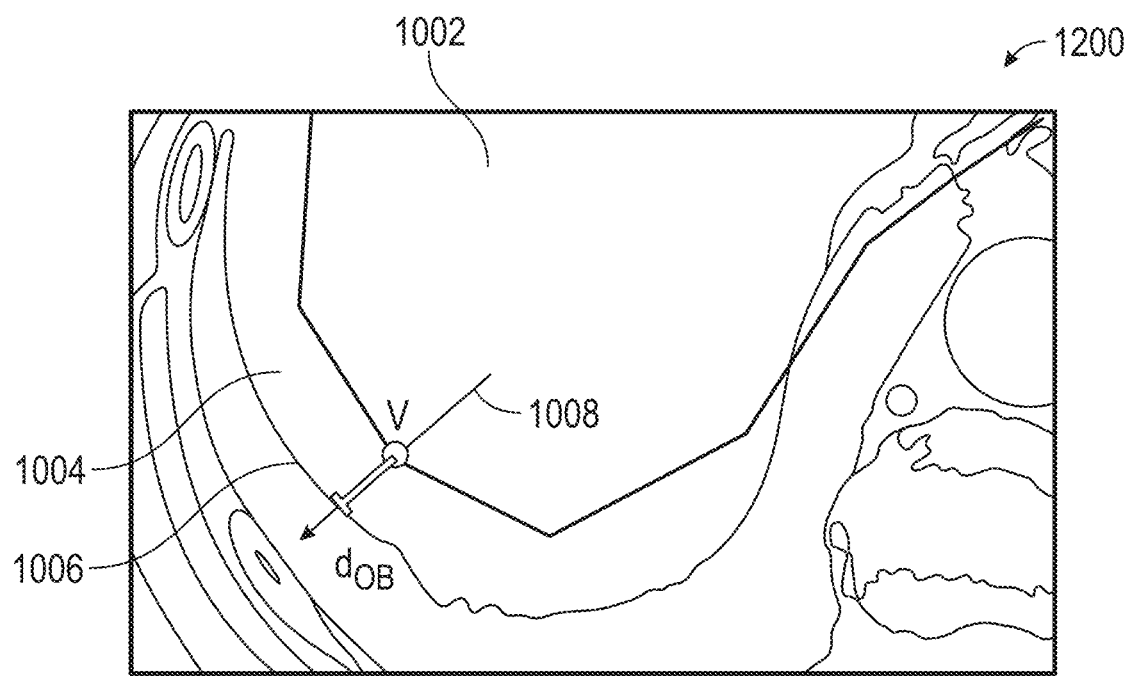
FIG. 12 is another screenshot of a portion of a region of interest of a patient.
Figure 13:
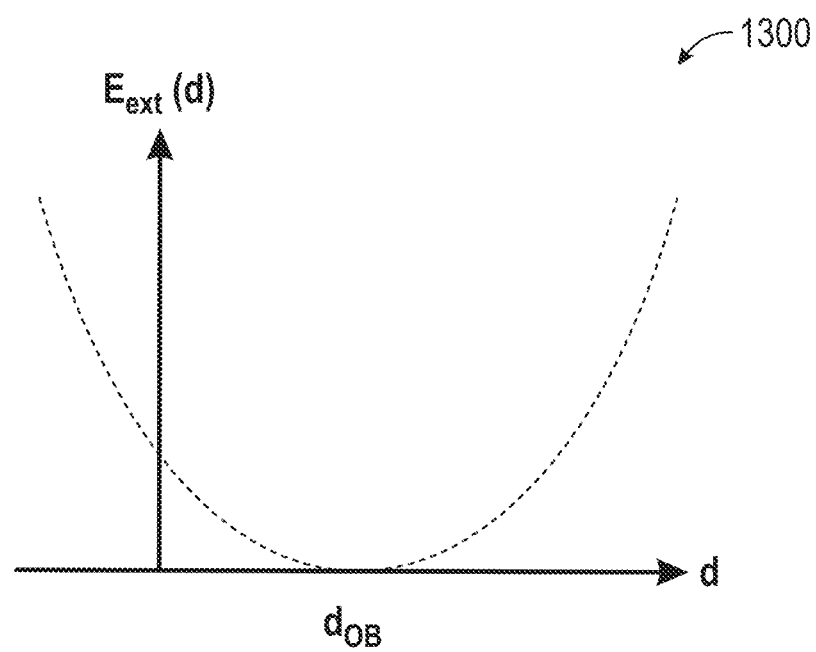
FIG. 13 is a graph of external energy versus distance.

An external energy may be expressed as a quadratic function whose minimum is located at a potential organ boundary point, such as shown in FIGS. 12 and 13.

FIG. 12 is another screenshot of a portion of a region of interest of a patient. The screenshot 1200 of FIG. 12 depicts a region of interest 1002, including a structure 1004, e.g., organ or bone, having a potential boundary 1006. A quadratic equation may be written whose minimum is placed at a distance $d_{OB}$, the location of the desired organ boundary along a ray 1008 corresponding to vertex V of a surface mesh and found by the edge-detection algorithm.

FIG. 13 is a graph 1300 of external energy versus distance. There exists one such external energy equation per vertex of the surface mesh. The quadratic equation of the external energy $E_{ext}(d)=ad^2+bd+c$ of all vertices may be used to determine to the smoothed region of interest boundary of FIG. 12.

Figure 14:
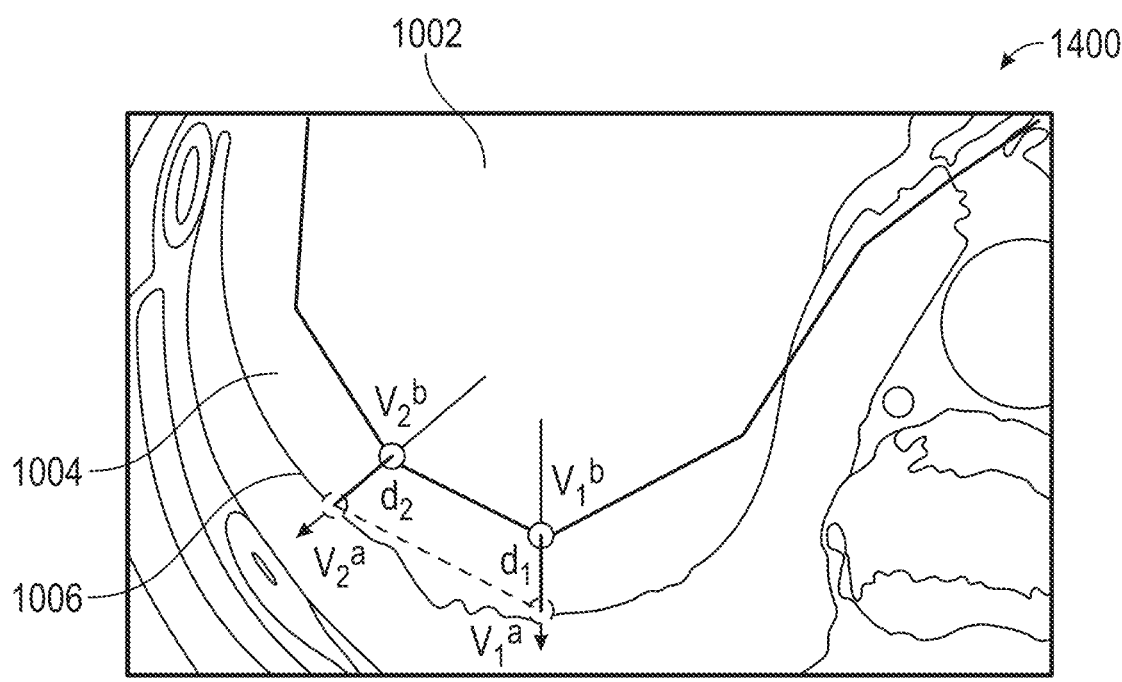
FIG. 14 is another screenshot of a portion of a region of interest of a patient.

An internal energy may be expressed as a quadratic function describing the deformation of a surface mesh edge such as shown in FIG. 14.

FIG. 14 is another screenshot of a portion of a region of interest of a patient. The screenshot 1400 of FIG. 14 depicts a region of interest 1002, including a structure 1004, e.g., organ or bone, having a potential boundary 1006. A quadratic equation is used that represents the difference between the edge defined by the desired organ boundary location $(V_1^a-V_2^a)$ and the edge of the mesh without deformation $(V_1^b-V_2^b)$. The quadratic equation for the internal energy $E_{int}(d_1, d_2)$ is given by $E_{int}(d_1, d_2)=\{(V_1^a-V_2^a)-(V_1^b-V_2^b)\}^2$.

Each vertex of the triangulated surface mesh contributes an amount of external energy based on the location of the potential organ boundary point along the ray intersecting that vertex. And each edge (connecting 2 adjacent vertices) of the mesh contributes an amount of internal energy based on how much the locations of the potential organ boundary points deform the shape.

The external and internal energies compete with each other. For example, the external energy represents the gradients in the image attempting to deform the shape to make it match the potential organ boundary points, while the internal energy wants to make the shape maintain a smooth surface. The total energy equation may be obtained by adding the external energy contributions of all vertices of the triangulated surface mesh and the internal energy contributions of all edges of the mesh. Finding the minimum of that total energy equation yields the compromised shape of the triangulated surface mesh, such as by minimizing the total energy equation by setting the derivatives of the total energy with respect to every vertex location to zero and solving the corresponding system of linear equations. The external and internal energies are described in more detail below.

The system may determine the 3D boundary of the region of interest by minimizing an energy equation representing external and internal energies of the surface mesh. The potential organ boundary points found may also be used as constraints when minimizing the energy equation in order to prevent the shape from going beyond those points. This is desirable because the surface mesh should not deform such that the final organ boundary point is further away from the center of the mesh than any desired organ boundary point as that would defeat the purpose of using an edge detection algorithm.

Further, the shape resulting from that search for potential organ boundary points and the minimization of the energy equation yields a 3D shape that is ultimately used for performing the painting action in 3D.

When the edge detection is not activated, the 3D paint brush may be represented as a sphere centered at the mouse position and is displayed in all three views. However, unlike for the 2D paint brush, as the user moves the mouse in a view, the diameter of the circle representing the paint brush in the other views depends on the distance between the x, y, and z mouse location and the plane displayed in the views, and therefore the radius changes with every mouse move. In other words, as the user moves the mouse along the superior-inferior direction in the sagittal or coronal view, the radius of the circle representing the paint brush in the axial view may vary from 0 mm to the paint brush diameter depending on the mouse location along the superior-inferior axis. A circle of the appropriate diameter may be shown to the user in the transverse, sagittal, and coronal views when the plane displayed intersects the paint brush sphere.

When the edge detection is activated, the 3D paint brush may be represented for the 3D contouring as a surface mesh according to the hierarchical triangular mesh concept described in "Indexing the Sphere with the Hierarchical Triangular Mesh", A. Szalay et al, Technical Report MSR-TR-2005-123, Microsoft Research, Redmond, WA 98052, 2005. The surface mesh may include a plurality of rays and have a center located at a position of a cursor controlled by the user. The edge detection algorithm may detect structure edges for a 3D boundary of a region of interest using the imaging parameters, e.g., density gradients or image voxel gray values, of the 3D spatial imaging data and along the plurality of rays.

Figure 15:
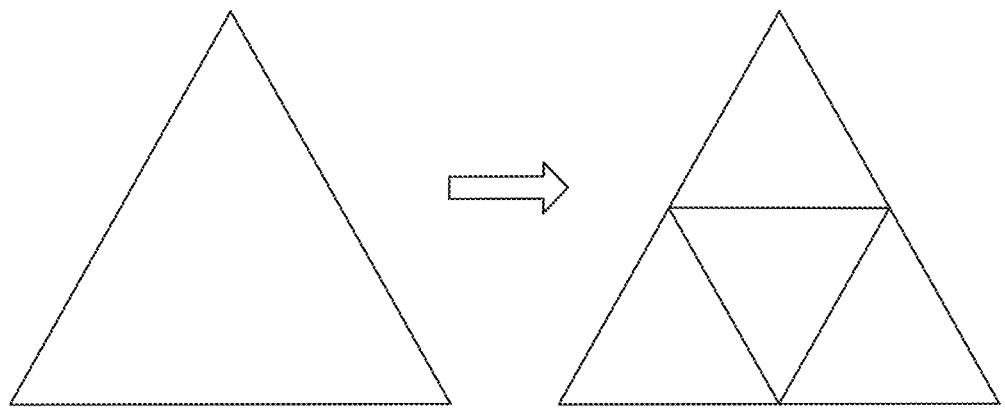
FIG. 15 is a conceptual diagram of a subdivision process of a triangular mesh.

FIG. 15 is a conceptual diagram of a subdivision process of a triangular mesh. A hierarchical triangular mesh starts off as a set of 6 rays whose direction cosines are (0, 0, 1), (1, 0, 0), (0, 1, 0), (−1, 0, 0), (0, −1, 0), and (0, 0, −1), forming eight triangles. Then, all triangles are subdivided into four triangles each by adding to the surface mesh three new rays whose direction cosines are determined by the bisectors of each one of the triangle's edges as shown in FIG. 15. In other words, three new rays are added at the bisectors of the three edges of the original triangle, and four smaller triangles replace the original larger triangle.

For the purpose of representing the 3D paint brush, this process of subdividing triangles is repeated as many times as needed until the longest triangle edge projected to the user-selected paint brush radius is less than or equal to some predefined value. As a non-limiting example, 5 mm may be used as the longest triangle edge allowed.

After the direction cosines of all rays and the triangles of the surface mesh are created, the edge-detection routine searches for a structure edge along each ray of the surface mesh, from the center to the paint brush radius. When looking for an edge along a ray, an example of logic that may be implemented includes the following:
1. Start at the center (C) of the surface mesh.
2. Interpolate the image value ($V_C$) at C, and calculate the corresponding brightness ($B_C$) using the display's window and level.
3. Calculate a first brightness difference threshold ($T_C$) using the user-selected sensitivity parameter (S); $T_C=B_C \times S$. $T_C$ will be used later to find an edge.
4. Take a step (of a pre-defined length) along the ray, and calculate the corresponding x, y, and z coordinates of that point (P).
5. Interpolate the image value ($V_P$) at P, and calculate the corresponding brightness ($B_P$) using the display's window and level.
6. Calculate a second brightness difference threshold ($T_P$) using S; $T_P=B_P \times S$. $T_P$ will be used later to find an edge.
7. Calculate the absolute brightness difference ($\Delta B$) between C and P; $\Delta B=|B_P-B_C|$.
8. If $\Delta B$ is less than $T_C$ and less than $T_P$, P is not an edge; go back to step 4. Otherwise, P may be an edge; and go to step 9.
9. Find the image set slice nearest to the y coordinate of P.
10. If the structure being contoured does not have at least one contour in that slice, go to step 11. Otherwise, go to step 12.
11. If the user is currently expanding the structure, P is an edge; and the search for an edge terminates. Otherwise, go back to step 4.
12. If P is inside the structure volume and the user is currently expanding the structure, P is not an edge; go back to step 4. Otherwise, go to step 13.
13. If P is inside the structure volume and the user is currently shrinking the structure, P is an edge; and the search for an edge terminates. Otherwise, go to step 14.
14. If P is outside the structure volume and the user is currently expanding the structure, P is an edge; and the search for an edge terminates. Otherwise, go to step 15.
15. If the step being evaluated is the last step along the ray, P is used as the edge; and the search for an edge terminates. Otherwise, go back to step 4.

After an edge is found for each ray of the surface mesh following the logic above and the surface mesh is smoothed using the techniques described below, the intersections of the surface mesh with the planes displayed may be calculated and shown to the user in the transverse, sagittal, and coronal views.

As indicated above, the edge detection algorithm may use a user-selected sensitivity parameter (S). The user may adjust a sensitivity of the edge detection algorithm by changing the sensitivity parameter (S), where the sensitivity is based on a difference in image voxel gray values.

When the 3D paint brush is activated, there may be three user actions that trigger the execution of the painting routine: clicking the left mouse button to start painting, moving the mouse while the left mouse is down, and releasing the left mouse button to stop painting at which point the painting is executed for the last time. These actions may be performed in any view.

In some implementations, every time the painting routine is executed, no matter in what view the user is moving the mouse, painting operations are performed on transverse contours. Contours on all image set slices that intersect the 3D paint brush may be modified based on the shape of the paint brush in each slice.

In some examples, when the edge detection is not activated and the user clicks or releases the left mouse button, the paint brush shape used to execute the painting routine may be a sphere centered at the mouse position, as described above.

When the user moves the mouse while the left button is down, the shape of the paint brush used to execute the painting routine may be calculated using the mouse position when the painting routine was last executed, and the current mouse position. Any mouse move of one pixel or more may be trigger an execution of the painting routine.

Depending on how fast the user moves the mouse, the current mouse position may be close to or far from the mouse position when the painting routine was last executed. In any case, the paint brush shape may be calculated by placing a sphere at the mouse position when the painting routine was last executed, placing a sphere at the current mouse position, and creating the 3D convex hull of these 2 spheres. In the end, the shape consists of a cylinder whose axis is congruent with the axis defined by the mouse position when the painting routine was last executed and the current mouse position and whose ends are defined by the same 2 points, and by placing a half sphere at each end. The radius of that cylinder and those 2 half spheres is the user-selected paint brush radius.

When the edge detection is activated and the user clicks or releases the left mouse button, the paint brush shape used to execute the painting routine is as described above.

When the user moves the mouse while the left button is down, the shape of the paint brush used to execute the painting routine may be calculated using the mouse position when the painting routine was last executed, and the current mouse position, as was the case when the edge detection is not activated, e.g., a cylinder and 2 half spheres. However, when the edge detection is activated, the paint brush shape may be represented as a surface mesh including a plurality of rays and having a center located at a position of a cursor controlled by the user, following an extension of the hierarchical triangular mesh concept as follows: the half sphere sections of the shape are calculated as described above, starting off as with set of 5 rays whose direction cosines are (0, 0, 1), (1, 0, 0), (0, 1, 0), (−1, 0, 0), and (0, −1, 0) in a coordinate system in which the xy plane is congruent with the flat surface of one of the shape's half spheres and the z axis is congruent with the axis of the shape's cylindrical section, and forming 4 triangles above the xy plane. As for the cylindrical section, it may be created using the following logic as shown in FIG. 16.

Figure 16:
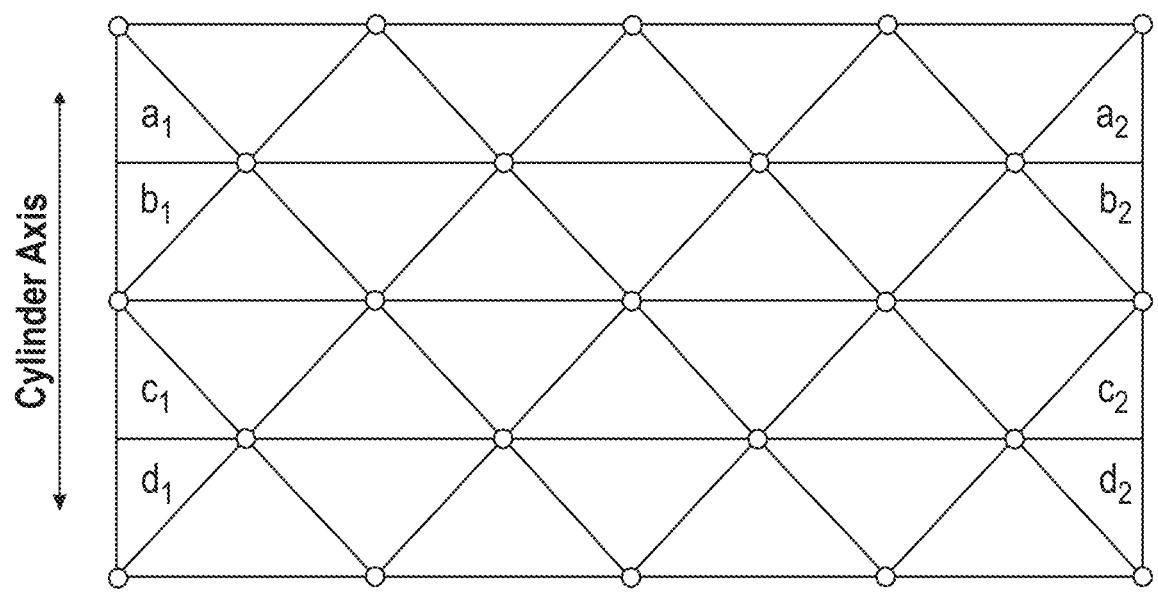
FIG. 16 is a conceptual illustration depicting a cylindrical section of the paint brush shape cut longitudinally, unwrapped, and laid flat.

FIG. 16 is a conceptual illustration depicting a cylindrical section of the paint brush shape cut longitudinally, unwrapped, and laid flat. The upper rows of vertices correspond to the rays created when the first half sphere of the shape is created and are the rays that are parallel to the xy plane. The sides $a_1$ and $a_2$ are 2 parts of the same triangle that come together when the cylinder is wrapped; similarly with sides $b_1$ and $b_2$, sides $c_1$ and $c_2$, and sides $d_1$ and $d_2$. The angular position of the rays in the odd-numbered rows is offset by half of the angular spacing between rays in any given row, thereby making the triangles on the cylinder surface isosceles triangles. Four rows of triangles are shown in FIG. 16.

The cylindrical section may be generated using the following non-limiting example of logic.
1. Calculate the number of rows of isosceles triangles needed to ensure the longest triangle edge projected to the user-selected paint brush radius is less than or equal to the same predefined value as for the half spheres.
2. Round the number of rows of triangles up to the nearest even number.
3. Create all rays of all rows making sure to place the origin of each ray along the axis of the cylinder such that the ray is normal to the surface of the cylinder.

After the cylindrical section is created, the first half sphere of the shape is duplicated, inverted, translated, and placed at the opposite end of the cylindrical section. Finally, the edge-detection algorithm described above may be used to find an edge for each ray of the surface mesh, and the surface mesh, which represents the paint brush shape, may be smoothed using a mesh smoothing algorithm as described below.

To smooth the surface mesh created by the detected edges, which represents the paint brush shape for the 3D contouring, an active-contour problem may be solved by the mesh smoothing algorithm. After the edge-detection routine has found a potential structure boundary for each ray of the surface mesh as described above, and before that surface mesh is displayed to the user in the transverse, sagittal, and coronal views, or used to execute the painting algorithm, a mesh smoothing algorithm is applied to the surface mesh. The algorithm used in an implementation of the active-contour algorithm as described in "Snakes: Active Contour Models", M. Kass et al, Schlumberger Palo Alto Research, 3340 Hillview Ave., Palo Alto, CA 94304, the entire contents of which being incorporated herein by reference.

When the mesh smoothing algorithm solves this problem, each ray of the plurality of rays of the surface mesh representing the paint brush and its detected edge contributes an amount of external energy, and each edge of the surface mesh, e.g., triangle edge, contributes an amount of internal energy. The total energy in the system is the sum of the external and internal energies. The external and internal energies may be expressed as quadratic functions, making the energy problem a linear least-squares problem.

In other words, smoothing the paint brush shape via a mesh smoothing algorithm may include determining a total energy problem, and processing the total energy problem to determine a solution to the total energy problem. As described below, processing the total energy problem to determine the solution to the total energy problem may include determining a derivative of the total energy problem, and minimizing the total energy function.

The external energy represents the effect of the external forces, e.g., the image voxel gray values, on the surface mesh and is calculated for each ray of the surface mesh. The external energy contribution from ray i of the surface mesh is a function of where the smoothed structure boundary $x_i$ representing the paint brush is located, and is written as $$E_{ext}(x_i) = A_i(x_i - b_i)^2,$$

where $b_i$ is the position of the desired structure boundary (the detected edge) along ray i, and $A_i$ is a constant. The value of $A_i$ may be determined empirically to make the magnitude of $E_{ext}(x_i)$ a reasonable value over the range of relevant $x_i$ values. The variable $x_i$ is a position along a ray of the surface mesh, and the range of relevant $x_i$ values is the same as the range of allowed paint brush radii, such as 1 mm through 20 mm. In a non-limiting example, the value of $A_i$ may be set to $$\frac{G_{b_i}}{10},$$

where $G_{b_i}$ is the image gradient at position $b_i$ along the ray. The image gradient $G_{b_i}$ is expressed as brightness/mm as defined by the display's window and level values and the study set coordinate system. That way when the image gradient at $b_i$ is higher, the external energy contribution from that ray will be larger, and the system will effectively put more weight on making the smoothed surface mesh go through $b_i$. Therefore, $$E_{ext}(x_i) = \frac{G_{b_i}}{10}(x_i - b_i)^2.$$

Some implementations may include a Weigh Edges With Gradients" option. When the "Weigh Edges With Gradients" option is not selected, the image gradient at position $b_i$ is not calculated and $G_{b_i}$ is a constant for all rays of the mesh. That way, all external energy contributions have equal weights.

The internal energy represents the effect of the internal forces, e.g., the surface mesh wanting to minimize its deformations, on the surface mesh and is calculated for each triangle edge of the surface mesh. The internal energy is calculated for each edge $\vec{e}_{ij}$ of the surface mesh.

Figure 17:
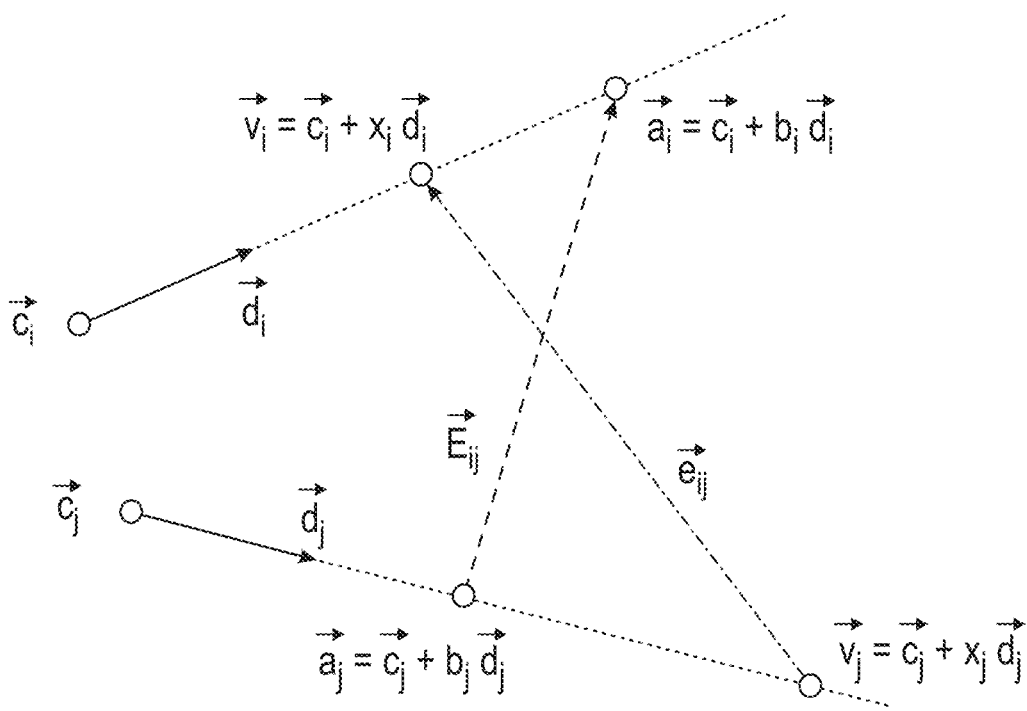
FIG. 17 is a conceptual drawing of surface mesh geometry explaining an internal energy calculation.

FIG. 17 is a conceptual drawing of surface mesh geometry explaining an internal energy calculation. For simplicity, two rays are shown in FIG. 17. The two rays correspond to two of the three rays that form any triangle of the surface mesh. Center points $\vec{c}_i$ and $\vec{c}_j$ are the center points of the rays and may be anywhere along the axis of the cylindrical section of the paint brush shape. Direction cosines $\vec{d}_i$ and $\vec{d}_j$ are the direction cosines of the rays. Smoothed positions $\vec{x}_i$ and $\vec{x}_j$ are the smoothed positions of the structure boundaries along the rays. Vertices $\vec{v}_i$ and $\vec{v}_j$ are the vertices corresponding to edge positions $\vec{x}_i$ and $\vec{x}_j$. The average structure boundary positions for the rays are represented by $\vec{b}_i$ and $\vec{b}_j$. The average structure boundary position of a ray may be calculated as the average of the detected structure boundary positions of all of its first neighbor rays and itself. The average vertices corresponding to averaged structure boundary positions $\vec{b}_i$ and $\vec{b}_j$ are represented by $\vec{a}_i$ and $\vec{a}_j$. Finally, $\vec{e}_{ij}$ is a smoothed edge of the surface mesh, and $\vec{E}_{ij}$ is its averaged counterpart.

The internal energy contribution from edge $\vec{e}_{ij}$ of the surface mesh representing the paint brush is written as $$E_{int}(x_i, x_j) = (\vec{e}_{ij} - \vec{E}_{ij})^2;$$

in other words, the square difference between the smoothed edge $(\vec{v}_j - \vec{v}_i)$ and its averaged counterpart $(\vec{a}_j - \vec{a}_i)$. Therefore, $$E_{int}(x_i, x_j) = [(\vec{v}_j - \vec{v}_i) - (\vec{a}_j - \vec{a}_i)]^2$$
$$= \{[(\vec{c}_j + x_j\vec{d}_j) - (\vec{c}_i + x_i\vec{d}_i)] - [(\vec{c}_j + b_j\vec{d}_j) - (\vec{c}_i + b_i\vec{d}_i)]\}^2$$
$$= [(x_j\vec{d}_j - x_i\vec{d}_i) - (b_j\vec{d}_j - b_i\vec{d}_i)]^2.$$

The total energy of the system is the weighted sum of all external energy contributions from all $N_r$ rays of the surface mesh, and all internal energy contributions from all $N_e$ triangle edges, $$E_{total}(\vec{x}) = \sum_{i=1}^{N_r} E_{ext}(x_i) + w_{int} \sum_{\vec{e}_{ij}}^{N_e} E_{int}(x_i, x_j).$$

The internal energy weight $w_{int}$ is a weighting factor that the user may adjust to control the surface mesh rigidity. The larger $w_{int}$, the more weight will be placed on the internal energy and the surface mesh will be smoother; the smaller $w_{int}$, the more weight will be placed on the external energy and the surface mesh will be noisier. In this manner, the mesh smoothing algorithm may adjust a smoothness of the mesh smoothing by applying a weighting factor to the determined internal energy contribution. Alternately, the mesh smoothing algorithm may adjust a smoothness of the mesh smoothing by applying a weighting factor to the determined external energy contribution.

The total energy of the system as a function of the edge positions $\vec{x}$ is a quadratic equation of all $x_r$ values. Its derivative with respect to each of the $x_r$ is a linear function and is given by $$\frac{\partial E_{total}(\vec{x})}{\partial x_r} = \sum_{i=1}^{N_r} \frac{\partial E_{ext}(x_i)}{\partial x_r} + w_{int} \sum_{\vec{e}_{ij}=1}^{N_e} \frac{\partial E_{int}(x_i, x_j)}{\partial x_r}.$$

By substituting $E_{ext}(x_i)$ and $E_{int}(x_i, x_j)$ with their previously calculated expressions, the following is obtained:

$$\frac{\partial E_{total}(\vec{x})}{\partial x_r} = \sum_{i=1}^{N_r} \frac{\partial \left[\frac{G_{b_i}}{10}(x_i - b_i)^2\right]}{\partial x_r} +$$
$$w_{int} \sum_{\vec{e}_{ij}=1}^{N_e} \frac{\partial \{[(x_j\vec{d}_j - x_i\vec{d}_i) - (b_j\vec{d}_j - b_i\vec{d}_i)]^2\}}{\partial x_r}$$

$$= 2w_{int} \sum_{\vec{e}_{ij}=1}^{N_e} \left\{[(x_j\vec{d}_j - x_i\vec{d}_i) - (b_j\vec{d}_j - b_i\vec{d}_i)] \cdot \frac{\partial(x_j\vec{d}_j - x_i\vec{d}_i)}{\partial x_r}\right\},$$

$$= 2w_{int} \sum_{\vec{e}_{ij}=1}^{N_e} \left\{[(x_j\vec{d}_j - x_i\vec{d}_i) - (b_j\vec{d}_i - b_i\vec{d}_i)] \cdot \vec{K}_{ijr}\right\}$$

where $\vec{K}_{ijr} = \frac{\partial(x_j\vec{d}_j - x_i\vec{d}_i)}{\partial x_r} = \begin{cases} \vec{d}_j & \text{if } r = j \\ -\vec{d}_i & \text{if } r = i \\ \vec{0} & \text{otherwise} \end{cases}.$ Finally, by setting all those derivatives to 0 (the derivative of a function at its minimum is 0), a system of $N_r$ equations is obtained that may be solved for $\vec{x}$, which represents the smoothed surface mesh representing the paint brush. The factor 2 that comes from the derivative of the internal energy quadratic function into $w_{int}$ (i.e. $2w_{int} \rightarrow w_{int}$) may be effectively absorbed without any practical consequence. Therefore, $$\frac{G_{b_r}}{5}(x_r - b_r) + w_{int} \sum_{\vec{e}_{ij}=1}^{N_e} \left\{[(x_j\vec{d}_j - x_i\vec{d}_i) - (b_j\vec{d}_j - b_i\vec{d}_i)] \cdot \vec{K}_{ijr}\right\} = 0.$$

Placing all constant terms (i.e. the terms that do not depend on $\vec{x}$) on the right-hand side yields $$\frac{G_{b_r}}{5}x_r + w_{int} \sum_{\vec{e}_{ij}=1}^{N_e} \left[(x_j\vec{d}_j - x_i\vec{d}_i) \cdot \vec{K}_{ijr}\right] =$$
$$\frac{G_{b_r}}{5}b_r + w_{int} \sum_{\vec{e}_{ij}=1}^{N_e} \left[(b_j\vec{d}_j - b_i\vec{d}_i) \cdot \vec{K}_{ijr}\right].$$

Grouping the terms in $x_i$, $x_j$, and $x_r$ on the left-hand side, and performing a similar grouping on the right-hand side yields $$\left(\frac{G_{b_r}}{5}\right)x_r + w_{int}\sum_{\tilde{e}_{ij}=1}^{N_e}\left[\left(\vec{d}_j\cdot\vec{K}_{ijr}\right)x_j - \left(\vec{d}_i\cdot\vec{K}_{ijr}\right)x_i\right] =$$

$$\frac{G_{b_r}}{5}b_r + w_{int}\sum_{\tilde{e}_{ij}=1}^{N_e}\left[\left(\vec{d}_j\cdot\vec{K}_{ijr}\right)b_j - \left(\vec{d}_i\cdot\vec{K}_{ijr}\right)b_i\right].$$

Finally, performing the inner products using the x, y, and z components of each vector on the left- and right-hand sides yields $$\left(\frac{G_{b_r}}{5}\right)x_r + w_{int}\sum_{\tilde{e}_{ij}=1}^{N_e}\left[\left(d_{j_x}K_{ijr_x} + d_{j_y}K_{ijr_y} + d_{j_z}K_{ijr_z}\right)x_j - \right.$$

$$\left.\left(d_{i_x}K_{ijr_x} + d_{i_y}K_{ijr_y} + d_{i_z}K_{ijr_z}\right)x_i\right] = \left(\frac{G_{b_r}}{5}\right)b_r +$$

$$w_{int}\sum_{\tilde{e}_{ij}=1}^{N_e}\left[\left(d_{j_x}K_{ijr_x} + d_{j_y}K_{ijr_y} + d_{j_z}K_{ijr_z}\right)b_j - \right.$$

$$\left.\left(d_{i_x}K_{ijr_x} + d_{i_y}K_{ijr_y} + d_{i_z}K_{ijr_z}\right)b_i\right].$$

This last equation is the one that is needed when coding and solving this energy system. There are $N_r$ such equations, one for each component of $\vec{x}$.

This system of equations may be written as a standard linear least-squares problem in the form $$A\vec{x}=B,$$

where A is the coefficient matrix whose values are calculated from the left-hand side of the equation above, and B is the right-hand side vector whose values are calculated from the right-hand side of the same equation. Because the external energy contribution to $$\frac{\partial E_{total}(\vec{x})}{\partial x_r}$$

depends on $x_r$ only, its contribution to matrix A only affects the diagonal elements of A. As for the internal energy contribution to $$\frac{\partial E_{total}(\vec{x})}{\partial x_r},$$

it depends on $x_i$ and $x_j$, but only when r=i or r=j, as $\vec{K}_{ijr}=\vec{0}$ for all other values of r. This means that only the edges $\vec{e}_{ij}$ of the surface mesh triangles that share ray r contribute to row r of matrix A. And since each ray r belongs to six edges at most in a hierarchical triangular mesh, there will never be more than seven elements (the diagonal element plus six others) per row in matrix A that will be different from 0. Since a typical surface mesh representing the 3D paint brush will have hundreds of rays, matrix A will be a sparse matrix.

In some examples, smoothing the paint brush shape via a mesh smoothing algorithm may include constraining the detected structure edges. For example, when the user selects the "Constrain Detected Edges" option, an addition step is performed after solving the energy system of equations described above. For every element $x_r$ that violates its detected edge location $b_r$, e.g., when $x_r$ is greater than $b_r$, a constraint may be placed in matrix A and vector B of the energy system of equations to force $x_r=b_r$. This may be implemented by modifying matrix A and vector B. This process of adding such an equality constraint is explained in the following example in which A is a 4×4 matrix and $x_2$ is forced to equal $b_2$. In matrix format, the unconstrained matrix A, vector B, and solution vector $\vec{x}$ are $$\begin{pmatrix} A_{11} & A_{12} & A_{13} & A_{14} \\ A_{21} & A_{22} & A_{23} & A_{24} \\ A_{31} & A_{32} & A_{33} & A_{34} \\ A_{41} & A_{42} & A_{43} & A_{44} \end{pmatrix}\begin{pmatrix} x_1 \\ x_2 \\ x_3 \\ x_4 \end{pmatrix} = \begin{pmatrix} B_1 \\ B_2 \\ B_3 \\ B_4 \end{pmatrix}$$

Row 2 (of the constrained element) of matrix A is replaced by its identity matrix equivalent and element $B_2$ of the right-hand side is set to $b_2$ as $$\begin{pmatrix} A_{11} & A_{12} & A_{13} & A_{14} \\ 0 & 1 & 0 & 0 \\ A_{31} & A_{32} & A_{33} & A_{34} \\ A_{41} & A_{42} & A_{43} & A_{44} \end{pmatrix}\begin{pmatrix} x_1 \\ x_2 \\ x_3 \\ x_4 \end{pmatrix} = \begin{pmatrix} B_1 \\ b_2 \\ B_3 \\ B_4 \end{pmatrix}$$

and its corresponding column and right-hand side vector are then updated to account for the constraint as $$\begin{pmatrix} A_{11} & 0 & A_{13} & A_{14} \\ 0 & 1 & 0 & 0 \\ A_{31} & 0 & A_{33} & A_{34} \\ A_{41} & 0 & A_{43} & A_{44} \end{pmatrix}\begin{pmatrix} x_1 \\ x_2 \\ x_3 \\ x_4 \end{pmatrix} = \begin{pmatrix} B_1 - A_{12}b_2 \\ b_2 \\ B_3 - A_{32}b_2 \\ B_4 - A_{42}b_2 \end{pmatrix}$$

Once this is done, row 2 and column 2 may be removed from the system of equation to reduce the size of the problem to solve as $$\begin{pmatrix} A_{11} & A_{13} & A_{14} \\ A_{31} & A_{33} & A_{34} \\ A_{41} & A_{43} & A_{44} \end{pmatrix}\begin{pmatrix} x_1 \\ x_3 \\ x_4 \end{pmatrix} = \begin{pmatrix} B_1 - A_{12}b_2 \\ B_3 - A_{32}b_2 \\ B_4 - A_{42}b_2 \end{pmatrix}$$

This process may be repeated for each equality constraint needed. After matrix A and vector B have been modified to include the desired constraints, the energy system of equations is solved one more time.

Although this disclosure describes, among other things, techniques for 3D contouring of a region of interest based on imaging parameters of 3D spatial imaging data and guided by user input of locations in the 3D spatial imaging data, which may be used for segmentation or radiation treatment planning, these techniques are not limited to 3D contouring. The paint brush tool with an edge-detection algorithm described above may correct for both the jagged contours and the painting routine not being executed often enough in 3D or 2D, or even 4D (e.g., 3D image data volumes obtained over a period of time). By using an edge-detection algorithm, the user does not need to focus as much attention on moving the mouse accurately because the system will find the true organ boundary (e.g., using the image gradient) automatically, which may also lead to more time savings, regardless of whether the painting is performed in 2D, 3D, or 4D.

When a 3D paint brush is used to modify a contour in one image slice of spatial imaging data, the image slices before the contoured image slice and the image slices after the contoured image slice may also be modified. For some users, this may be undesirable because previously contoured image slices may be changed by the contouring of a current image slice. As such, a user that has already contoured three image slices, for example, may be frustrated by seeing their previous efforts contouring those three image slices altered by contouring on a current fourth image slice.

To solve this problem, the present inventor has recognized the desirability of a "half 3D paint brush" or "partial 3D paint brush" option. When contouring an image slice with the half 3D paint brush option enabled, the image slices after the current image slice may be modified, but not the image slices before the current image slice. In other words, contouring a current image slice may affect downstream (or non-contoured) image slices, but not upstream image slices (or previously contoured). As such, only image slices in one direction from the current image slice are affected. In this manner, the system may paint the boundary in a current image slice, for display to the user, and paint the boundary only in images slices in one direction from the current image slice, for display to the user.

The half 3D paint brush option may save the user time because downstream image slices are already contoured. For example, if the user is satisfied with the contouring on a second image slice that resulted from contouring a first image slice, the user may move on to a third image slice without editing the contouring on the second image slice. As another example, if the user is partially satisfied with the contouring on a second image slice that resulted from contouring a first image slice, the user may edit the contouring on the second image slice and then move onto a third image slice.

An image may include several image slices and the paint brush shape, which is in 3D, is split across multiple image slices. Any given image slice may intersect the paint brush shape and a contour that is being modified, and the system determines a union (or difference) of those two, which is the final contour.

With a "full 3D paint brush" option, the system may loop through all the image slices in the image. The system determines the intersection of the paint brush shape with the image slice and calculates the union (or difference) of the existing contour of the structure that the user is modifying and the paint brush shape, which results in a new contour. The system then executes the painting routine described above on each image slice (2D) of the image, which includes image slices upstream and downstream of the current image slice. To implement the "half 3D paint brush" option, the system may execute the painting routine by starting in the current plane, e.g., the current image slice, and then only on image slices downstream of the current image slice, and not on image slices upstream that have already been contoured by the user.

In another example implementation of a "half 3D paint brush" or "partial 3D paint brush" option, the user may select how many image slices downstream of the current image slice may be affected by the contouring on the current image slice. For example, a user may select that no image slices downstream of the current slice are to be affected by the contouring on the current image slice. As another example, the user may select that one or more image slices are to be affected by the contouring on the current image slice. For example, if the user selects that two image slices are to be affected by the contouring on the current image slice, then contouring of a first (current) image slice may affect a second image slice and a third image slice that are downstream of the first image slice. However, no previously contoured image slices upstream of the first (current) image slice would be affected by contouring of the first image slice. As such, only image slices in one direction from the current image slice are affected. In this manner, the system may paint the boundary in a current image slice, for display to the user, and paint the boundary only in a user-selected number of images slices in one direction from the current image slice, for display to the user.

Figure 18:
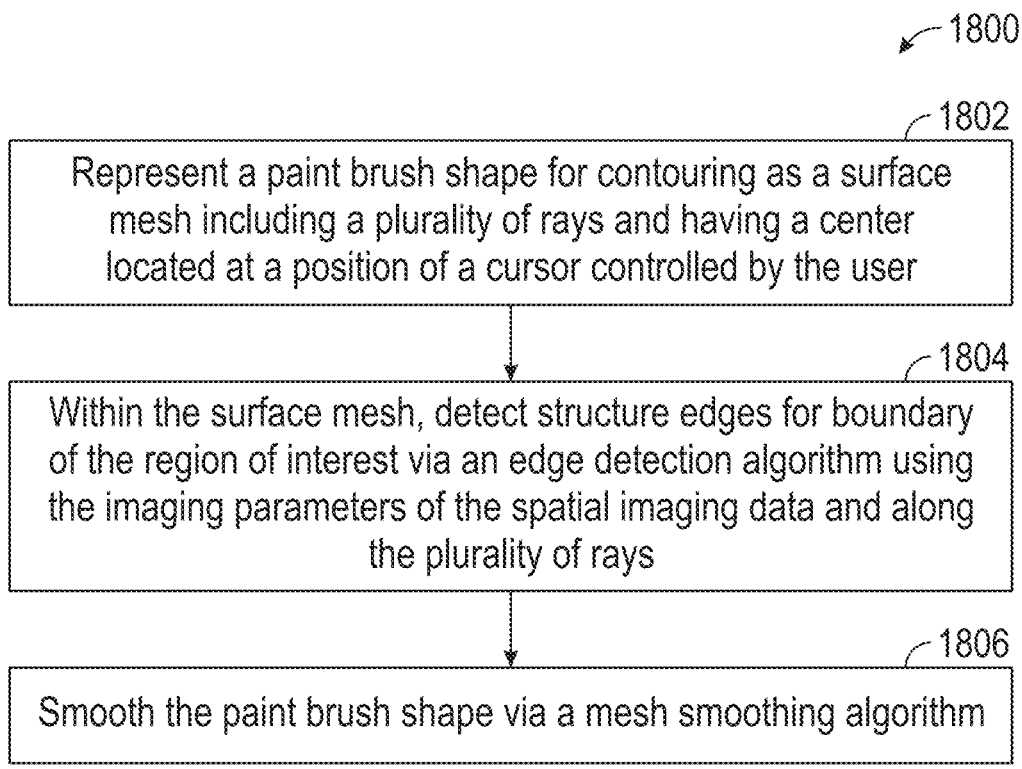
FIG. 18 illustrates a flow diagram of an example of a computer-implemented method of contouring of a region of interest based on imaging parameters of spatial imaging data and guided by user input of locations in the spatial imaging data, according to some embodiments of the present disclosure.

FIG. 18 illustrates a flow diagram of an example of a computer-implemented method of contouring of a region of interest based on imaging parameters of spatial imaging data and guided by user input of locations in the spatial imaging data, according to some embodiments of the present disclosure. The method 1800 is represented as a set of blocks 1802-1806 that describe operations of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 18. The one or more processors may instruct other components of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At block 1802, the method 1800 may include representing a paint brush shape for the contouring, e.g., 3D or partial 3D, as a surface mesh including a plurality of rays and having a center located at a position of a cursor controlled by the user.

At block 1804, the method 1800 may include, within the surface mesh, detecting structure edges for a boundary, e.g., 3D or partial 3D, of the region of interest via an edge detection algorithm using the imaging parameters of the spatial imaging data, e.g., 3D or partial 3D, and along the plurality of rays.

At block 1806, the method 1800 may include smoothing the paint brush shape via a mesh smoothing algorithm. In some examples, the method 1800 may include painting, e.g., 3D or partial 3D painting, the boundary in the spatial imaging data for display to the user.

In some examples, smoothing the paint brush shape via the mesh smoothing algorithm may include determining a total energy problem, and processing the total energy problem to determine a solution to the total energy problem.

In some examples, processing the total energy problem to determine the solution to the total energy problem may include determining a derivative of the total energy problem to minimize a total energy function.

In some examples, determining the total energy problem may include determining an external energy contribution for the plurality of rays of the surface mesh and determining an internal energy contribution for edges of the surface mesh.

In some examples, the method 1800 may include adjusting a smoothness of the mesh smoothing by applying a weighting factor to the determined internal energy contribution.

In some examples, smoothing the paint brush shape via a mesh smoothing algorithm may include constraining the detected mesh vertices.

In some examples, the method 1800 may include adjusting a sensitivity of the edge detection algorithm, wherein the sensitivity is based on a difference in image voxel gray values.

Figure 19:
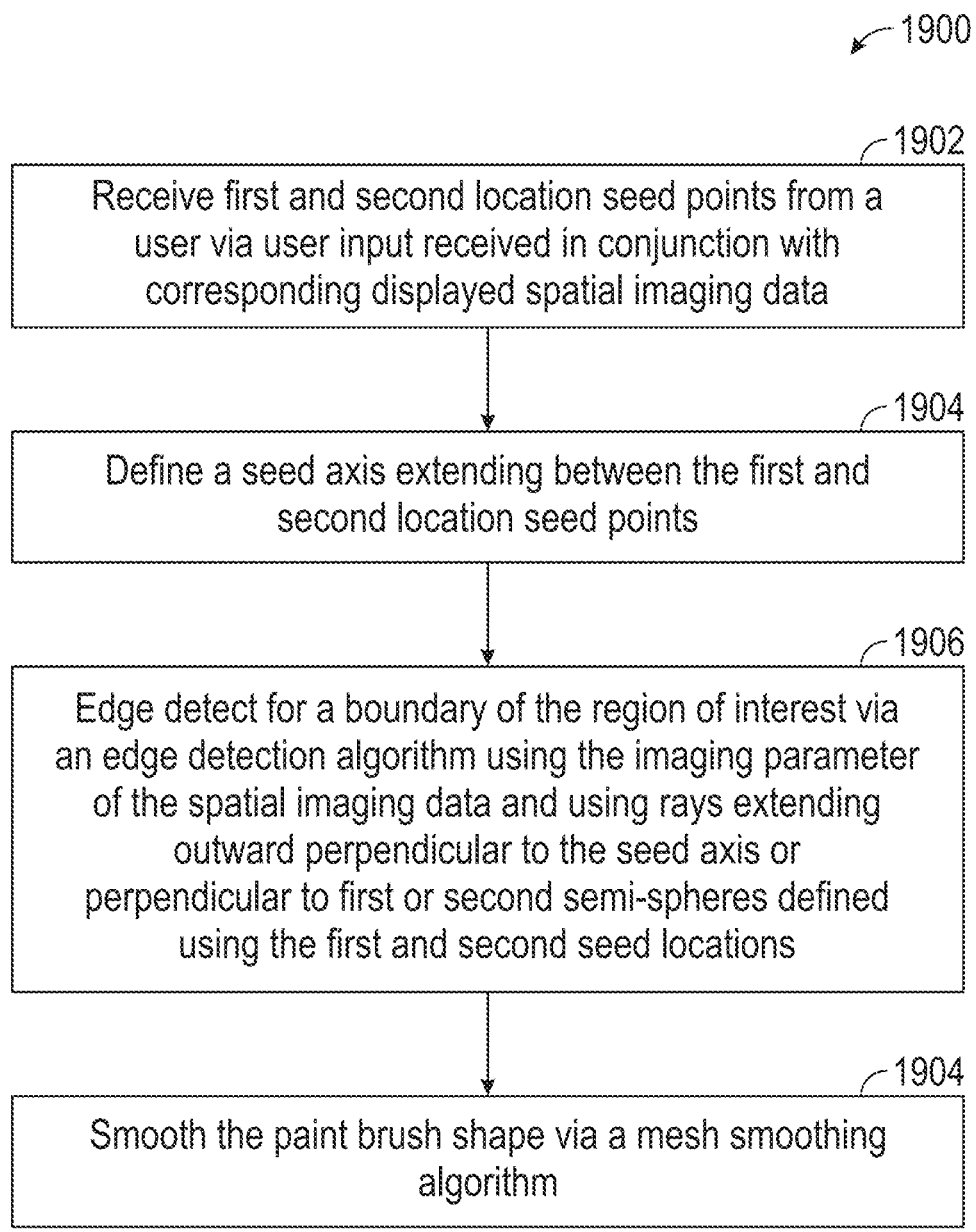
FIG. 19 illustrates a flow diagram of another example of a computer-implemented method of contouring of a region of interest based on imaging parameters of spatial imaging data and guided by user input of locations in the spatial imaging data, according to some embodiments of the present disclosure.

FIG. 19 illustrates a flow diagram of another example of a computer-implemented method of contouring of a region of interest based on imaging parameters of spatial imaging data and guided by user input of locations in the spatial imaging data, according to some embodiments of the present disclosure. The method 1900 is represented as a set of blocks 1902-1908 that describe operations of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 19. The one or more processors may instruct other components of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At block 1902, the method 1900 may include receiving first and second location seed points from the user via user input received in conjunction with corresponding displayed spatial imaging data. For example, a 3D shape may be created using the current mouse location and the mouse location at the time the painting routine was last executed.

At block 1904, the method 1900 may include defining a seed axis extending between the first and second location seed points. For example, the system may define a seed axis extending between the first and second location seed points and create a union of the two spheres (one placed at the current mouse location, and the other at the mouse location at the time the painting routine was last executed).

At block 1906, the method 1900 may include edge detecting for a boundary, e.g., 3D or partial 3D, of the region of interest via an edge detection algorithm using the imaging parameter of the spatial imaging data, e.g., 3D or partial 3D, and using rays extending outward perpendicular to the seed axis or perpendicular to first or second semi-spheres defined using the first and second seed locations.

At block 1908, the method 1900 may include smoothing the paint brush shape via a mesh smoothing algorithm.

In some examples, a surface mesh of triangles is used to define a paint brush shape that does not extend beyond the boundary of the region of interest. In some examples, the method 1900 includes determining the boundary of the region of interest by minimizing an energy equation representing external and internal energies of the surface mesh. In some examples, the energy equation is a quadratic equation representing external and internal energies of the surface mesh.

In some examples, the method may include painting, e.g., 3D or partial 3D painting, the boundary in the spatial imaging data for display to the user.

A computer-readable medium may include instructions that, when executed, cause one or more processors to perform the operations described with respect to FIGS. 18 and 19, and other techniques described in this disclosure.

Figure 20:
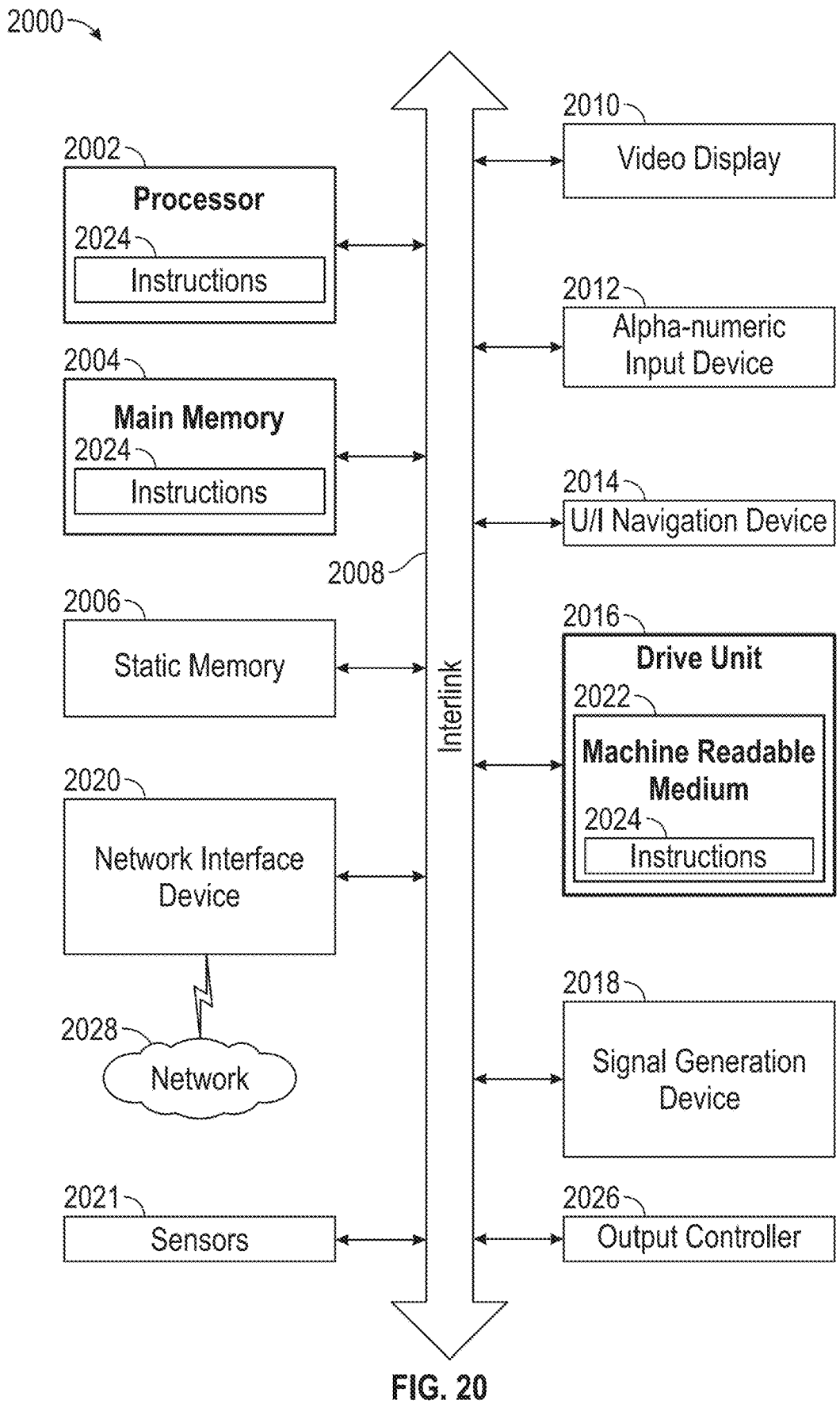
FIG. 20 illustrates an example of a block diagram of a machine on which one or more of the methods as discussed herein may be implemented.

FIG. 20 illustrates a block diagram of an embodiment of a machine 2000 on which one or more of the methods as discussed herein may be implemented. In one or more embodiments, one or more items of the image processing device 112 may be implemented by the machine 2000. In alternative embodiments, the machine 2000 operates as a standalone device or may be connected (e.g., networked) to other machines. In one or more embodiments, the image processing device 112 may include one or more of the items of the machine 2000. In a networked deployment, the machine 2000 may operate in the capacity of a server or a client machine in server-client network environment, or as a peer machine in a peer-to-peer (or distributed) network environment. The machine 2000 may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine 2000 is illustrated, the term "machine" shall also be taken to include any collection of machines that individually or jointly execute a set (or multiple sets) of instructions to perform any one or more of the methodologies discussed herein.

The example machine 2000 includes processing circuitry (e.g., the processor 2002, a CPU, a GPU, an ASIC, circuitry, such as one or more transistors, resistors, capacitors, inductors, diodes, logic gates, multiplexers, buffers, modulators, demodulators, radios (e.g., transmit or receive radios or transceivers), sensors 2021 (e.g., a transducer that converts one form of energy (e.g., light, heat, electrical, mechanical, or other energy) to another form of energy), or the like, or a combination thereof), a main memory 2004 and a static memory 2006, which communicate with each other via a bus 2008. The machine 2000 (e.g., computer system) may further include a video display unit 2010 (e.g., a liquid crystal display (LCD) or a cathode ray tube (CRT)). The machine 2000 also includes an alphanumeric input device 2012 (e.g., a keyboard), a user interface (UI) navigation device 2014 (e.g., a mouse), a disk drive or mass storage unit 2016, a signal generation device 2018 (e.g., a speaker), and a network interface device 2020.

The disk drive or mass storage unit 2016 includes a machine-readable medium 2022 on which is stored one or more sets of data structures and instructions (e.g., software) 2024 embodying or utilized by any one or more of the methodologies or functions described herein. The instructions 2024 may also reside, completely or at least partially, within the main memory 2004 and/or within the processor 2002 during execution thereof by the machine 2000, the main memory 2004 and the processor 2002 also constituting machine-readable media.

The machine 2000 as illustrated includes an output controller 2026. The output controller 2026 manages data flow to/from the machine 2000. The output controller 2026 is sometimes called a device controller, with software that directly interacts with the output controller 2026 being called a device driver.

While the machine-readable medium 2022 is shown in an embodiment to be a single medium, the term "machine-readable medium" may include a single medium or multiple media (e.g., a centralized or distributed database, and/or associated caches and servers) that store the one or more instructions 2024 or data structures. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), EEPROM, and flash memory devices; magnetic disks such as internal hard disks and removable disks; magneto-optical disks; and CD-ROM and DVD-ROM disks.

The instructions 2024 may further be transmitted or received over a communications network 2028 using a transmission medium. The instructions 2024 may be transmitted using the network interface device 2020 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

As used herein, "communicatively coupled between" means that the entities on either of the coupling must communicate through an item therebetween and that those entities cannot communicate with each other without communicating through the item.

ADDITIONAL NOTES

The above detailed description includes references to the accompanying drawings, which form a part of the detailed description. The drawings show, by way of illustration but not by way of limitation, specific embodiments in which the disclosure may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a," "an," "the," and "said" are used when introducing elements of aspects of the disclosure or in the embodiments thereof, as is common in patent documents, to include one or more than one or more of the elements, independent of any other instances or usages of "at least one" or "one or more." In this document, the term "or" is used to refer to a nonexclusive or, such that "A or B" includes "A but not B," "B but not A," and "A and B," unless otherwise indicated.

In the appended claims, the terms "including" and "in which" are used as the plain-English equivalents of the respective terms "comprising" and "wherein." Also, in the following claims, the terms "comprising," "including," and "having" are intended to be open-ended to mean that there may be additional elements other than the listed elements, such that elements after such a term (e.g., comprising, including, having) in a claim are still deemed to fall within the scope of that claim. Moreover, in the following claims, the terms "first," "second," and "third," and so forth, are used merely as labels, and are not intended to impose numerical requirements on their objects.

Embodiments of the disclosure may be implemented with computer-executable instructions. The computer-executable instructions (e.g., software code) may be organized into one or more computer-executable components or modules. Aspects of the disclosure may be implemented with any number and organization of such components or modules. For example, aspects of the disclosure are not limited to the specific computer-executable instructions, or the specific components or modules illustrated in the figures and described herein. Other embodiments of the disclosure may include different computer-executable instructions or components having more or less functionality than illustrated and described herein.

Method examples (e.g., operations and functions) described herein may be machine or computer-implemented at least in part (e.g., implemented as software code or instructions). Some examples may include a computer-readable medium or machine-readable medium encoded with instructions operable to configure an electronic device to perform methods as described in the above examples. An implementation of such methods may include software code, such as microcode, assembly language code, a higher-level language code, or the like (e.g., "source code"). Such software code may include computer-readable instructions for performing various methods (e.g., "object" or "executable code"). The software code may form portions of computer program products. Software implementations of the embodiments described herein may be provided via an article of manufacture with the code or instructions stored thereon, or via a method of operating a communication interface to send data via a communication interface (e.g., wirelessly, over the internet, via satellite communications, and the like).

Further, the software code may be tangibly stored on one or more volatile or non-volatile computer-readable storage media during execution or at other times. These computer-readable storage media may include any mechanism that stores information in a form accessible by a machine (e.g., computing device, electronic system, and the like), such as, but are not limited to, floppy disks, hard disks, removable magnetic disks, any form of magnetic disk storage media, CD-ROMS, magnetic-optical disks, removable optical disks (e.g., compact disks and digital video disks), flash memory devices, magnetic cassettes, memory cards or sticks (e.g., secure digital cards), RAMs (e.g., CMOS RAM and the like), recordable/non-recordable media (e.g., ROMs), EPROMS, EEPROMS, or any type of media suitable for storing electronic instructions, and the like. Such computer-readable storage medium coupled to a computer system bus may be accessible by the processor and other parts of the OIS.

In an embodiment, the computer-readable storage medium may have encoded a data structure for a treatment planning, wherein the treatment plan may be adaptive. The data structure for the computer-readable storage medium may be at least one of a Digital Imaging and Communications in Medicine (DICOM) format, an extended DICOM format, an XML format, and the like. DICOM is an international communications standard that defines the format used to transfer medical image-related data between various types of medical equipment. DICOM RT refers to the communication standards that are specific to radiation therapy.

In various embodiments of the disclosure, the method of creating a component or module may be implemented in software, hardware, or a combination thereof. The methods provided by various embodiments of the present disclosure, for example, may be implemented in software by using standard programming languages such as, for example, Compute Unified Device Architecture (CUDA), C, C++, Java, Python, JavaScript and the like; and using standard machine learning/deep learning library (or API), such as tensorflow, torch and the like; and combinations thereof. As used herein, the terms "software" and "firmware" are interchangeable, and include any computer program stored in memory for execution by a computer.

A communication interface includes any mechanism that interfaces to any of a hardwired, wireless, optical, and the like, medium to communicate to another device, such as a memory bus interface, a processor bus interface, an Internet connection, a disk controller, and the like. The communication interface may be configured by providing configuration parameters and/or sending signals to prepare the communication interface to provide a data signal describing the software content. The communication interface may be accessed via one or more commands or signals sent to the communication interface.

The present disclosure also relates to a system for performing the operations herein. This system may be specially constructed for the required purposes, or it may comprise a general-purpose computer selectively activated or reconfigured by a computer program stored in the computer. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

In view of the above, it will be seen that the several objects of the disclosure are achieved, and other beneficial results attained. Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

The above description is intended to be illustrative, and not restrictive. For example, the above-described examples (or one or more aspects thereof) may be used in combination with each other. In addition, many modifications may be made to adapt a particular situation or material to the teachings of the disclosure without departing from its scope. While the dimensions, types of materials and coatings described herein are intended to define the parameters of the disclosure, they are by no means limiting and are example embodiments. Many other embodiments will be apparent to those of skill in the art upon reviewing the above description. The scope of the disclosure should, therefore, be determined with reference to the appended claims, along with the full scope of equivalents to which such claims are entitled.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the disclosure should be determined with reference to the appended claims, along with the full scope of equivalents to which such claims are entitled. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

The claimed invention is:

1. A computer-implemented method of contouring of a region of interest based on imaging parameters of 3D spatial imaging data and guided by user input of locations in the spatial imaging data, the method comprising:
representing a paint brush shape for the contouring as a surface mesh including a plurality of rays and having a center located at a position of a cursor controlled by the user;
within the surface mesh, detecting structure edges for a boundary of the region of interest via an edge detection algorithm using the imaging parameters of the 3D spatial imaging data and along the plurality of rays;
smoothing the paint brush shape via a mesh smoothing algorithm; and
painting the boundary in the 3D spatial imaging data for display to the user, including:
painting the boundary in a current image slice; and
painting the boundary only in images slices in one direction from the current image slice, wherein the 3D spatial imaging data includes a plurality of image slices.

2. The method of claim 1, wherein smoothing the paint brush shape via the mesh smoothing algorithm includes:
determining a total energy problem; and
processing the total energy problem to determine a solution to the total energy problem.

3. The method of claim 2, wherein processing the total energy problem to determine the solution to the total energy problem includes:
determining a derivative of a total energy equation; and
minimizing the total energy equation.

4. The method of claim 2, wherein determining the total energy problem includes:
   determining an external energy contribution for the plurality of rays of the surface mesh; and
   determining an internal energy contribution for edges of the surface mesh.

5. The method of claim 4, comprising:
   adjusting a smoothness of the mesh smoothing by applying a weighting factor to the determined internal energy contribution or the determined external energy contribution.

6. The method of claim 1, wherein smoothing the paint brush shape via a mesh smoothing algorithm includes:
   constraining the detected structure edges.

7. The method of claim 1, comprising:
   adjusting a sensitivity of the edge detection algorithm, wherein the sensitivity is based on a difference in image voxel gray values.

8. A non-transitory computer-readable storage device configured to include instructions that, when executed by a machine, cause the machine to perform operations comprising:
   representing a paint brush shape for contouring as a surface mesh including a plurality of rays and having a center located at a position of a cursor controlled by a user;
   within the surface mesh, detecting structure edges for a boundary of a region of interest via an edge detection algorithm using imaging parameters of spatial imaging data and along the plurality of rays;
   smoothing the paint brush shape via a mesh smoothing algorithm; and
   painting the boundary in the spatial imaging data for display to the user, including:
      painting the boundary in a current image slice; and
      painting the boundary only in images slices in one direction from the current image slice, wherein the spatial imaging data includes a plurality of image slices.

9. The computer-readable storage device of claim 8, wherein smoothing the paint brush shape via the mesh smoothing algorithm comprises:
   determining a total energy problem; and
   processing the total energy problem to determine a solution to the total energy problem.

10. The computer-readable storage device of claim 9, wherein processing the total energy problem to determine the solution to the total energy problem comprises:
   determining a derivative of a total energy equation; and
   minimizing the total energy equation.

11. The computer-readable storage device of claim 9, wherein determining the total energy problem comprises:
   determining an external energy contribution for the plurality of rays of the surface mesh; and
   determining an internal energy contribution for edges of the surface mesh.

12. The computer-readable storage device of claim 11, wherein the operations comprise:
   adjusting a smoothness of the mesh smoothing by applying a weighting factor to the determined internal energy contribution.

13. The computer-readable storage device of claim 8, wherein smoothing the paint brush shape via a mesh smoothing algorithm includes:
   constraining the detected structure edges.

14. The computer-readable storage device of claim 8, wherein the operations comprise:
   adjusting a sensitivity of the edge detection algorithm, wherein the sensitivity is based on a difference in image voxel gray values.

15. A computer-implemented method of contouring of a region of interest based on imaging parameters of spatial imaging data and guided by user input of locations in the spatial imaging data, the method comprising:
   representing a paint brush shape for contouring as a surface mesh including a plurality of rays and having a center located at a position of a cursor controlled by a user;
   within the surface mesh, detecting structure edges for a boundary of the region of interest via an edge detection algorithm using the imaging parameters of the spatial imaging data and along the plurality of rays;
   smoothing the paint brush shape via a mesh smoothing algorithm; and
   painting the boundary in the spatial imaging data for display to the user, including:
      painting the boundary in a current image slice; and
      painting the boundary only in a user-selected number of images slices in one direction from the current image slice, wherein the spatial imaging data includes a plurality of image slices.

16. The method of claim 15, wherein smoothing the paint brush shape via the mesh smoothing algorithm includes:
   determining a total energy problem; and
   processing the total energy problem to determine a solution to the total energy problem.

17. The method of claim 16, wherein processing the total energy problem to determine the solution to the total energy problem includes:
   determining a derivative of a total energy equation; and
   minimizing the total energy equation.

18. The method of claim 16, wherein determining the total energy problem includes:
   determining an external energy contribution for the plurality of rays of the surface mesh; and
   determining an internal energy contribution for edges of the surface mesh.

19. The method of claim 18, comprising:
   adjusting a smoothness of the mesh smoothing by applying a weighting factor to the determined internal energy contribution or the determined external energy contribution.

20. The method of claim 15, wherein smoothing the paint brush shape via a mesh smoothing algorithm includes:
   constraining the detected structure edges.

21. The method of claim 15, comprising:
   adjusting a sensitivity of the edge detection algorithm, wherein the sensitivity is based on a difference in image voxel gray values.

22. A non-transitory computer-readable storage device configured to include instructions that, when executed by a machine, cause the machine to perform operations comprising:
   representing a paint brush shape for contouring as a surface mesh including a plurality of rays and having a center located at a position of a cursor controlled by a user;
   within the surface mesh, detecting structure edges for a boundary of a region of interest via an edge detection algorithm using imaging parameters of spatial imaging data and along the plurality of rays;
   smoothing the paint brush shape via a mesh smoothing algorithm; and painting the boundary in the spatial imaging data for display to the user, including:
   painting the boundary in a current image slice; and
   painting the boundary only in a user-selected number of images slices in one direction from the current image slice, wherein the spatial imaging data includes a plurality of image slices.

23. The computer-readable storage device of claim 22, wherein smoothing the paint brush shape via the mesh smoothing algorithm comprises:
   determining a total energy problem; and
   processing the total energy problem to determine a solution to the total energy problem.

24. The computer-readable storage device of claim 23, wherein processing the total energy problem to determine the solution to the total energy problem comprises:
   determining a derivative of a total energy equation; and
   minimizing the total energy equation.

25. The computer-readable storage device of claim 23, wherein determining the total energy problem comprises:
   determining an external energy contribution for the plurality of rays of the surface mesh; and
   determining an internal energy contribution for edges of the surface mesh.

26. The computer-readable storage device of claim 25, wherein the operations comprise:
   adjusting a smoothness of the mesh smoothing by applying a weighting factor to the determined internal energy contribution.

27. The computer-readable storage device of claim 22, wherein smoothing the paint brush shape via a mesh smoothing algorithm includes:
   constraining the detected structure edges.

28. The computer-readable storage device of claim 22, wherein the operations comprise:
   adjusting a sensitivity of the edge detection algorithm, wherein the sensitivity is based on a difference in image voxel gray values.

* * * * *

UNITED STATES PATENT AND TRADEMARK OFFICE
CERTIFICATE OF CORRECTION

PATENT NO. : 12,136,222 B2
APPLICATION NO. : 17/658783
DATED : November 5, 2024
INVENTOR(S) : Michel Moreau Page 1 of 1

It is certified that error appears in the above-identified patent and that said Letters Patent is hereby corrected as shown below:

In the Claims

In Column 37, Line 40, in Claim 9, after "The", insert --non-transitory--

In Column 37, Line 46, in Claim 10, after "The", insert --non-transitory--

In Column 37, Line 51, in Claim 11, after "The", insert --non-transitory--

In Column 37, Line 57, in Claim 12, after "The", insert --non-transitory--

In Column 37, Line 62, in Claim 13, after "The", insert --non-transitory--

In Column 37, Line 66, in Claim 14, after "The", insert --non-transitory--

In Column 39, Line 8, in Claim 23, after "The", insert --non-transitory--

In Column 39, Line 14, in Claim 24, after "The", insert --non-transitory--

In Column 39, Line 19, in Claim 25, after "The", insert --non-transitory--

In Column 40, Line 5, in Claim 26, after "The", insert --non-transitory--

In Column 40, Line 10, in Claim 27, after "The", insert --non-transitory--

In Column 40, Line 14, in Claim 28, after "The", insert --non-transitory--

Signed and Sealed this
Fourteenth Day of October, 2025

John A. Squires
*Director of the United States Patent and Trademark Office*